US010704753B2

(12) United States Patent
Potter et al.

(10) Patent No.: US 10,704,753 B2
(45) Date of Patent: Jul. 7, 2020

(54) AUXILIARY HEADLAMP ASSEMBLY FOR PRODUCING A SUPPLEMENTAL LOW BEAM

(71) Applicant: Valeo North America, Inc., Seymour, IN (US)

(72) Inventors: Brant James Potter, Columbus, IN (US); Gavin Francis Warner, Columbus, IN (US); Patton Davis Baker, Columbus, IN (US); John Steven Orisich, Columbus, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/477,524

(22) Filed: Apr. 3, 2017

(65) Prior Publication Data

US 2018/0283645 A1 Oct. 4, 2018

(51) Int. Cl.

| | |
|---|---|
| ***B60Q 1/16*** | (2006.01) |
| ***F21S 41/00*** | (2018.01) |
| ***F21S 41/14*** | (2018.01) |
| ***F21S 41/164*** | (2018.01) |
| ***F21S 41/43*** | (2018.01) |
| ***F21S 41/147*** | (2018.01) |
| ***F21S 41/25*** | (2018.01) |
| ***F21S 41/141*** | (2018.01) |
| ***F21S 41/32*** | (2018.01) |
| ***F21S 41/40*** | (2018.01) |
| *F21W 102/135* | (2018.01) |

(52) U.S. Cl.

CPC ............... *F21S 41/00* (2018.01); *F21S 41/14* (2018.01); *F21S 41/141* (2018.01); *F21S 41/147* (2018.01); *F21S 41/164* (2018.01); *F21S 41/25* (2018.01); *F21S 41/321* (2018.01); *F21S 41/40* (2018.01); *F21S 41/43* (2018.01); *F21W 2102/135* (2018.01)

(58) Field of Classification Search

CPC F21S 41/00; F21S 41/26; F21S 41/43; F21W 2102/14; F21W 2102/145

USPC .................................................. 362/543, 514

See application file for complete search history.

(56) References Cited

U.S. PATENT DOCUMENTS

| | | | | |
|---|---|---|---|---|
| 4,922,389 A * | 5/1990 | Nino | F21S 41/32 362/539 |
| 6,309,094 B1 * | 10/2001 | Woerner | B60Q 1/12 362/539 |
| 8,550,678 B2 | 10/2013 | Cejnek et al. | |

(Continued)

OTHER PUBLICATIONS

Driver Guide—Chapter 9, Dec. 2016, Missouri DMV, web link (Year: 2016).*

*Primary Examiner* — Evan P Dzierzynski
*Assistant Examiner* — Keith G. Delahoussaye
(74) *Attorney, Agent, or Firm* — Valeo North America, Inc.

(57) ABSTRACT

An auxiliary lamp for a vehicle. Ordinary headlamps are restricted by law in the intensity that they direct towards oncoming drivers. This can cause inconveniently low illumination to a side of the vehicle, such as along a line 20 or 25 degrees left of center for a left-hand driver side vehicle. An auxiliary headlamp assembly is added to provide an auxiliary beam that supplements the primary beam. The auxiliary beam increases illumination along this line, yet maintains total illumination toward oncoming drivers below allowed limits.

19 Claims, 36 Drawing Sheets

(56) References Cited

U.S. PATENT DOCUMENTS

| | | | | |
|---|---|---|---|---|
| 8,905,609 | B2 * | 12/2014 | Tessnow | B60Q 1/0058 362/539 |
| 2003/0031020 | A1 * | 2/2003 | Komatsu | B60Q 1/12 362/465 |
| 2003/0156420 | A1 * | 8/2003 | Tatsukawa | B60Q 1/12 362/465 |
| 2003/0174493 | A1 * | 9/2003 | Kinouchi | B60Q 1/12 362/43 |
| 2004/0165373 | A1 * | 8/2004 | Reismiller | B60Q 1/12 362/36 |
| 2005/0201117 | A1 * | 9/2005 | Sugimoto | F21S 41/698 362/539 |
| 2008/0112173 | A1 * | 5/2008 | Dassanayake | B60Q 1/12 362/466 |
| 2009/0196061 | A1 * | 8/2009 | Nakamura | B60Q 1/12 362/523 |
| 2015/0377442 | A1 * | 12/2015 | Bhakta | F21S 41/25 362/510 |
| 2017/0227184 | A1 * | 8/2017 | Ishida | F21S 48/1747 |
| 2019/0001868 | A1 * | 1/2019 | Kaino | B60Q 1/1423 |

* cited by examiner

Test Points

| Name | Hmin | Value Min +1/4deg | RegMax | Value Max | Value Max +1/4deg |
|---|---|---|---|---|---|
| 10U–90U | –90 | | 125 | 126* | N.A |
| 4U–8L | –8 | | | | |
| 4U–8R | 8 | | | | |
| 2U–4L | –4 | 133 | | | |
| 1.5U–1R to 3R | 1 | | | | |
| 1.5U–1R to R | 1 | | 1400 | 268* | |
| 1U–1.5L to L | –90 | | 700 | 194* | |
| 0.5U–1.5L to L | –90 | | 1000 | 304* | |
| 0.5U–1R to 3R | 1 | | 2700 | 1206 | |
| H–4L | –4 | | | | |
| H–8L | –8 | | | | |
| 0.6D–1.3R | 1.3 | | | | |
| 0.86D–V | 0 | | | | |
| 0.86D–3.5L | –3.5 | | 12000 | 11478 | |
| 1.5D–2R | 2 | | | | |
| 2D–9L | –9 | | | | |
| 2D–9R | 9 | | | | |
| 2D–15L | –15 | | | | |
| 2D–15R | 15 | | | | |
| 4D–4R | 4 | | 12500 | 11160 | |
| 4D–20L | –20 | | | | |
| 4D–20R | 20 | | | | |

*Warning: Test point is not fully inside tested window.

*Fig.15*

FIG 19

| Name | Hmin | Value Min | Value Min +1/4deg | RegMax | Value Max | Value Max +1/4deg |
|---|---|---|---|---|---|---|
| 180-90U | -90 | | | 125 | 136 * | N.A |
| 40-8L | -8 | 132 | | | | |
| 40-8R | 8 | 144 | | | | |
| 20-4L | -4 | 171 | | | | |
| 1.8U-1R to 3R | 1 | 283 | | | | |
| 1.5U-1R to R | 1 | | | 1 400 | 218 * | |
| 1U-1.5L to L | -90 | | | 700 | 246 * | |
| 0.5U-1.5L to L | -90 | | | 1 000 | 318 * | |
| 0.8U-1R to 3R | 1 | 888 | 2 071 | 2 700 | 1 253 | |
| 8-4L | -4 | 887 | | | | |
| 8-8L | -8 | 1 888 | | | | |
| 0.8D-1.3R | 1.3 | 22 408 | | | | |
| 0.86D-V | 0 | 23 407 | | | | |
| 0.86D-3.5L | -3.5 | 14 886 | | 12 000 | 14 888 | 18 828 |
| 1.5D-2R | 2 | 21 872 | | | | |
| 20-9L | -9 | 11 618 | | | | |
| 20-9R | 9 | 7 707 | | | | |
| 2D-15L | -15 | 18 882 | | | | |
| 2D-15R | 15 | 2 404 | | | | |
| 40-4R | 4 | | | 12 500 | 18 400 | |
| 4D-20L | -20 | 18 881 | | | | |
| 4D-20R | 20 | 828 | | | | |

* Warning: Test point is not fully inside tested window.

$$x^2 / a^2 + y^2 r^2 b = 1$$

$$d_2 + d_1 = 2a$$

AUXILIARY HEADLAMP ASSEMBLY FOR PRODUCING A SUPPLEMENTAL LOW BEAM

BACKGROUND OF THE INVENTION

1. Field of the Invention

This invention relates to a lighting device for a vehicle, and more particularly, to an auxiliary lamp assembly for producing a supplemental low beam that is combined to produce a composite beam providing better visibility than a primary beam.

2. Description of the Related Art

Current forward lighting systems for vehicles may be considered to be lacking in intensity and distance according to industry standards. For example, organizations, such as the Insurance Institute for Highway Safety (IIHS) are interested in reducing vehicle crashes and they publish recommendations regarding headlamps. IIHS places importance on improving down-road visibility in headlamp curves.

IIHS measures the reach of a vehicle's headlights as the vehicle travels straight and on curves. Sensors on the track measure how far from the vehicle the light extends with an increase of at least 5 lux. As is well known, a lux describes (in lumens) the amount of light falling on the road. For comparison, a full moon on a cloudless night illuminates the ground to about 1 lux. IIHS measures five approaches, straightaway, gradual left curve (800 ft. radius, 244 meters), gradual right curve (800 ft. radius, 244 meters), sharp left hand curve (500 ft. radius, 152 meters) and sharp right hand curve (500 ft. radius, 152 meters). The headlights are tested for each beam pattern and the IIHS rating is assigned. While the IIHS rating is in some jurisdictions not a mandatory requirement, there is a general goal of car manufacturers to adopt or try to achieve light beam patterns that will improve the safety of a vehicle, even if such patterns have higher standards than what is imposed by government regulation.

It is, therefore, desired to provide a headlamp assembly, system and method that is adapted to generate an improved low beam pattern that is capable of achieving improved levels of low beam visibility, light distribution, and reach, consistent with IIHS specifications or their equivalents.

SUMMARY OF THE INVENTION

One object of the invention is to provide an improved headlamp assembly, system and method that is adapted to generate an improved low beam having improved light distribution, visibility and reach in curve scenarios, consistent with IIHS specifications.

Another object of the invention is to provide an improved headlamp assembly that is adapted and capable of meeting IIHS standards.

Still another object of the invention is to provide a headlamp assembly having a compact auxiliary light source that generates an auxiliary light beam that is combined with the primary beam to provide an improved beam pattern.

Yet another object of the invention is to provide a headlamp assembly having a light beam assembly for generating a supplemental beam pattern.

In another aspect, one embodiment of the invention comprises a headlamp system for a vehicle, comprising a primary lamp unit having a first light source configured to be capable of forming a light distribution pattern forward of the vehicle, the light distribution pattern being made of a plurality of predetermined areas, at least of one of the plurality of predetermined areas has a reduced illumination or is deprived of illumination with respect to one other of the plurality of predetermined areas, the one of the plurality of predetermined areas being forward and outboard of the vehicle, and an auxiliary light source configured to provide illumination at the one of the plurality of predetermined areas, thereby providing a composite beam having a desired pattern.

In another aspect, another embodiment of the invention comprises an auxiliary headlamp for a vehicle, comprising at least one light source; a reflector that receives light rays from the light source and reflects the light rays forward of the vehicle; a lens; an optical shield or mask between the reflector and the lens which forms part of a non-symmetrical exit aperture of the auxiliary headlamp; and a lens which receives light exiting the exit aperture and projects light forward of the vehicle; the auxiliary headlamp providing an auxiliary light beam for supplementing an intensity of a primary beam in predetermined areas.

In yet another aspect, another embodiment of the invention comprises an auxiliary headlamp for a vehicle in which government regulations place maximum intensity limits which a headlamp beam projects in a first area of a headlamp beam in front of the vehicle comprising at least one light source; a reflector which reflects light emitted from the at least one light source forward of the vehicle; an optical shield or mask which cooperates with the reflector to form an exit aperture and which has a step which reduces a height of the exit aperture on at least one side; and a lens which focuses light received from the at least one light source and the exit aperture, wherein the auxiliary headlamp does not increase intensity in the predetermined area of the headlamp beam, while substantially simultaneously increasing an intensity of at least one other area of the headlamp beam above the limits. The invention further improves color uniformity, visibility while driving on curves, color blending, and low beam compliance with IIHS specifications.

This invention, including all embodiments shown and described herein, could be used alone or together and/or in combination with one or more of the following list of features:

The headlamp system wherein the auxiliary light source comprises a light source, a reflector having different elliptical cross sections along its length, an optical stop which forms part of a non-symmetrical exit aperture of the auxiliary light source, and causes the exit aperture to assume a first height at a first location and a second height at a second location, and a lens which receives light exiting the exit aperture and projects the light forward of the vehicle.

The headlamp system wherein one of the at least one predetermined area is located at least 225 feet (69 meters) forward of the vehicle and at least 75 feet (23 meters) outboard of the vehicle on a driver's side. For ease of illustration, metric conversions are rounded up.

The headlamp system wherein the at least one predetermined area is located at least 225 feet (69 meters) forward of the vehicle and at least 75 feet (23 meters) outboard of the vehicle on a passenger's side.

The headlamp system wherein a limit is placed on illumination intensity at direction (0.86D, 3.5L), the composite beam not exceeding the limit.

The headlamp system wherein the auxiliary light source is situated in a separate housing compared to the primary headlamp.

The auxiliary headlamp wherein the primary beam comprises a maximum luminous intensity at a predetermined area of the primary beam, wherein a luminous intensity of the primary beam and the auxiliary beam combined at the predetermined area do not exceed a predetermined limit.

The auxiliary headlamp wherein the exit aperture has a first height on one side of a step and a different height on the other side of the step.

The auxiliary headlamp wherein the predetermined test point is approximately located (0.86D, −3.5L) of the primary beam.

The auxiliary headlamp wherein the auxiliary beam increases illumination to (0.6D, −3.5L).

The auxiliary headlamp wherein the step causes a region of reduced intensity in the beam of the auxiliary headlamp, thereby preventing intensity in the first direction from exceeding the limit.

The auxiliary headlamp wherein the predetermined test point comprises a direction of about (0.86D, −3.5L)

The auxiliary headlamp wherein the at least one other area passes through a point located at least 225 feet (69 meters) forward of the vehicle, and at least 75 feet (23 meters) outboard of the vehicle on a driver's side.

The auxiliary headlamp wherein the at least one other area passes through a point located at least 225 (69 meters) feet forward of the vehicle, and at least 75 feet (23 meters) outboard of the vehicle on a passenger's side.

The auxiliary headlamp wherein the at least one other area passes through a point located at least 225 feet (69 meters) forward of the vehicle, and at least 75 feet (23 meters) outboard of the vehicle on a driver's side.

The auxiliary headlamp wherein the optical shield comprises two shields that form an L-shape in cross-section.

The auxiliary headlamp wherein the auxiliary light pattern is generally rectangular.

The auxiliary headlamp wherein the auxiliary light pattern is generally rectangular.

These and other objects and advantages of the invention will be apparent from the following description, the accompanying drawings and the appended claims.

BRIEF DESCRIPTION OF THE ACCOMPANYING DRAWINGS

Figure 1:
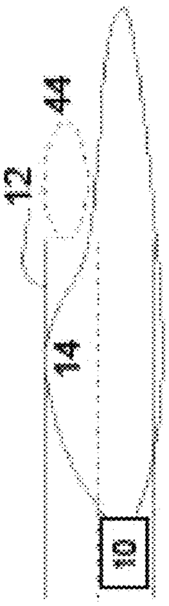
FIG. 1 is a simplified overhead view of a vehicle on a roadway, and shows a headlight beam projected by the vehicle and a blank region has lower illumination.
Figure 2:
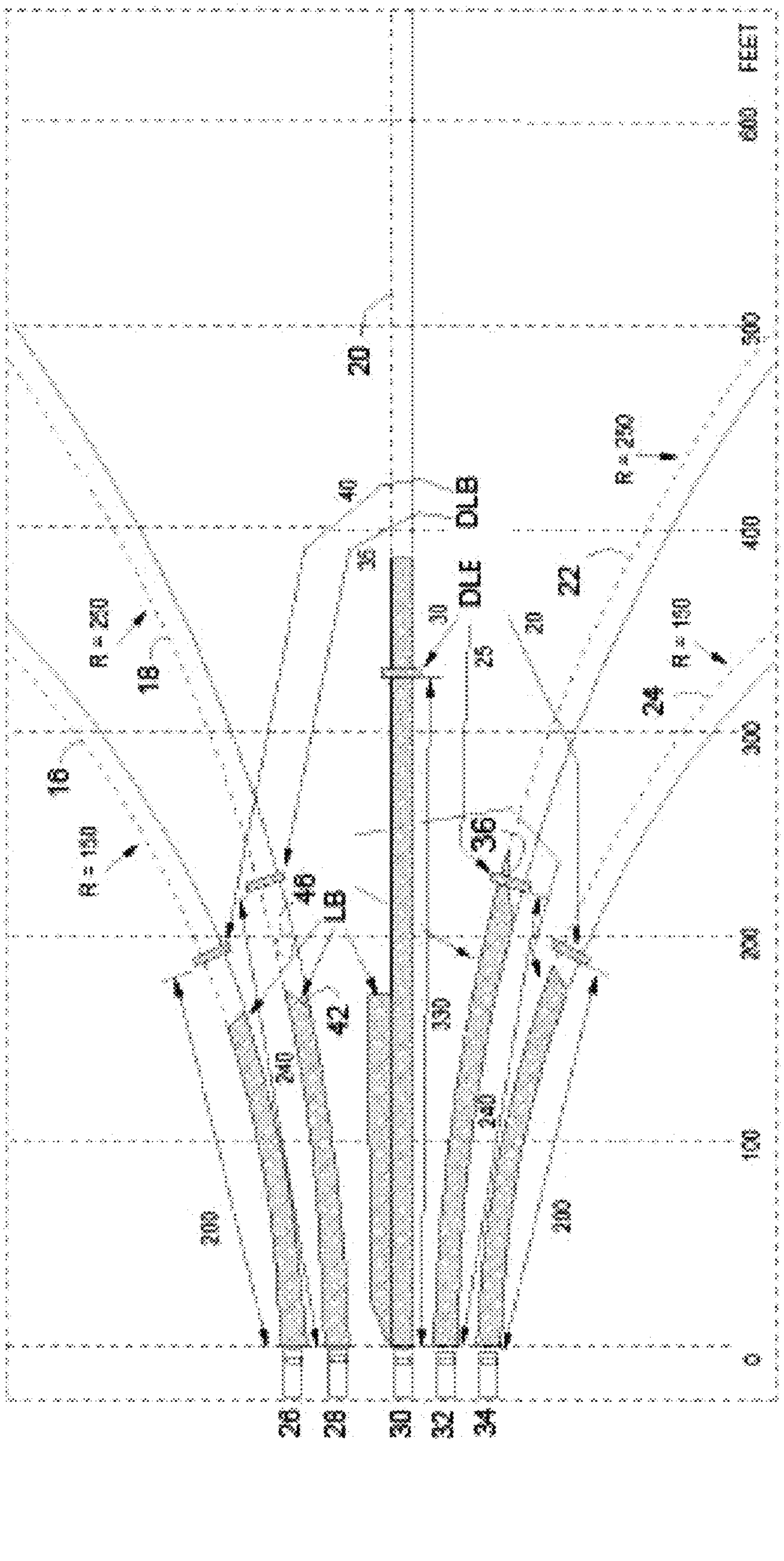
FIG. 2 represents five roadways with five vehicles projecting distinct beam patterns.
Figure 3:
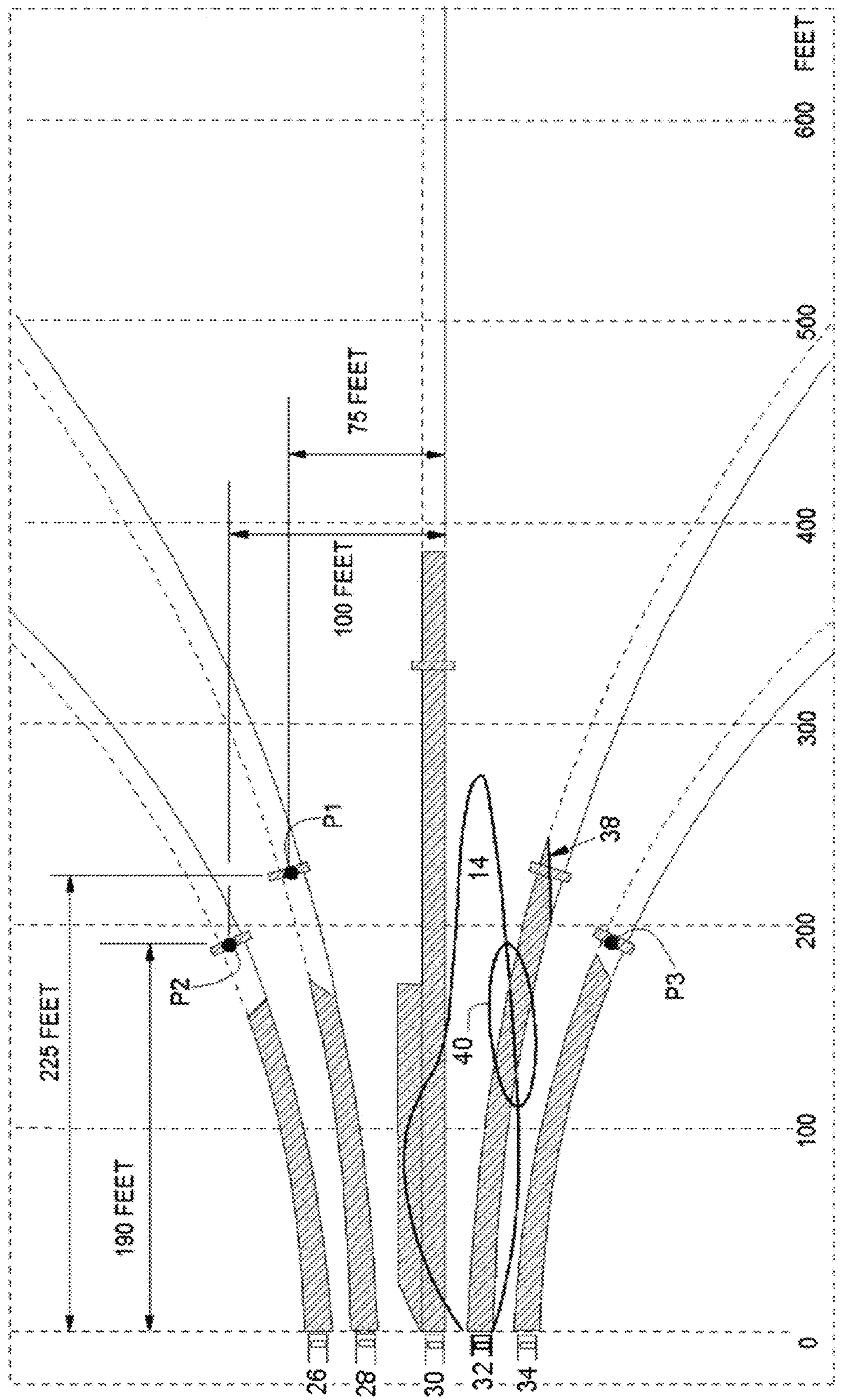
Figure 4:
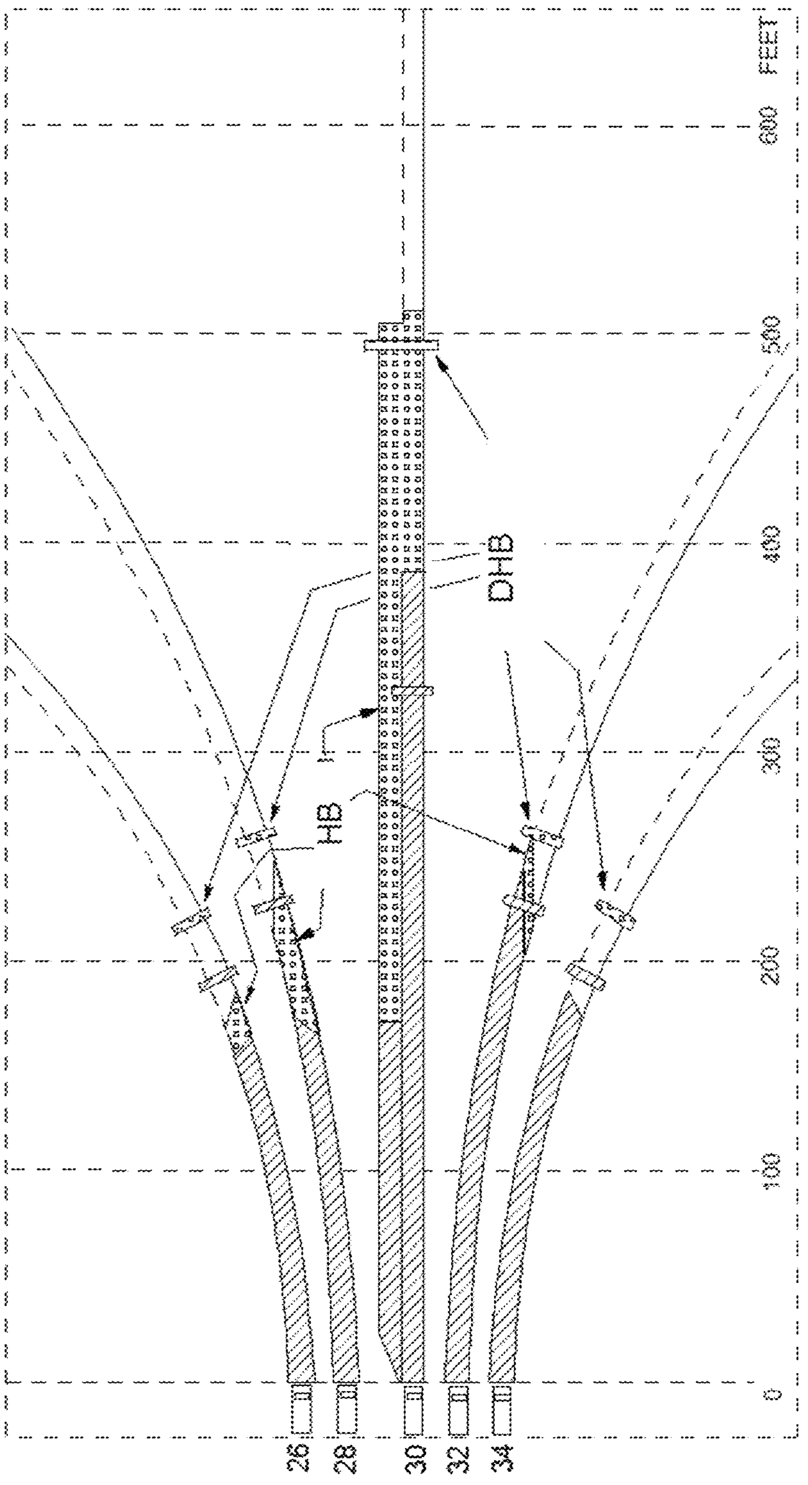
Figure 5:
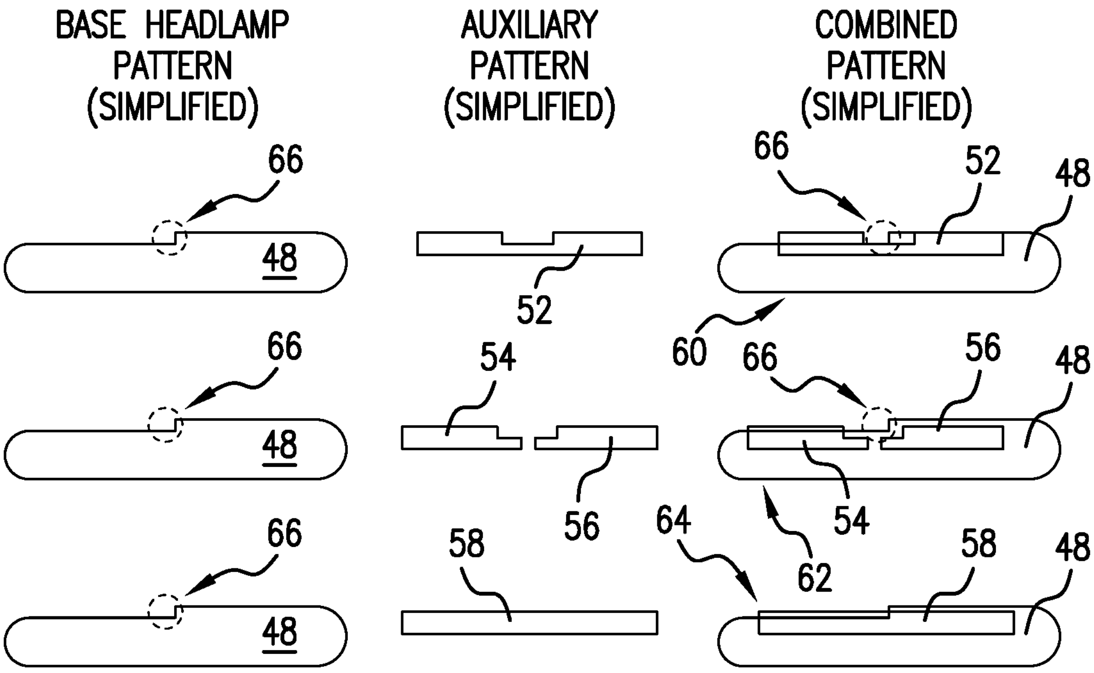
Figure 6:
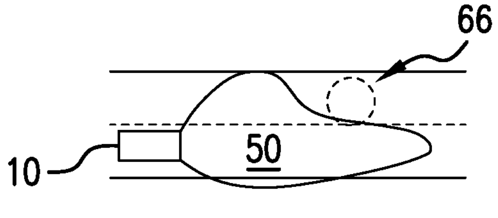
Figure 7:
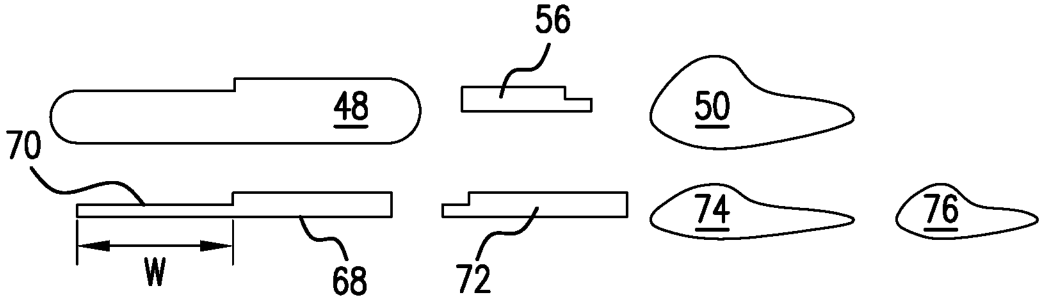
Figure 8:
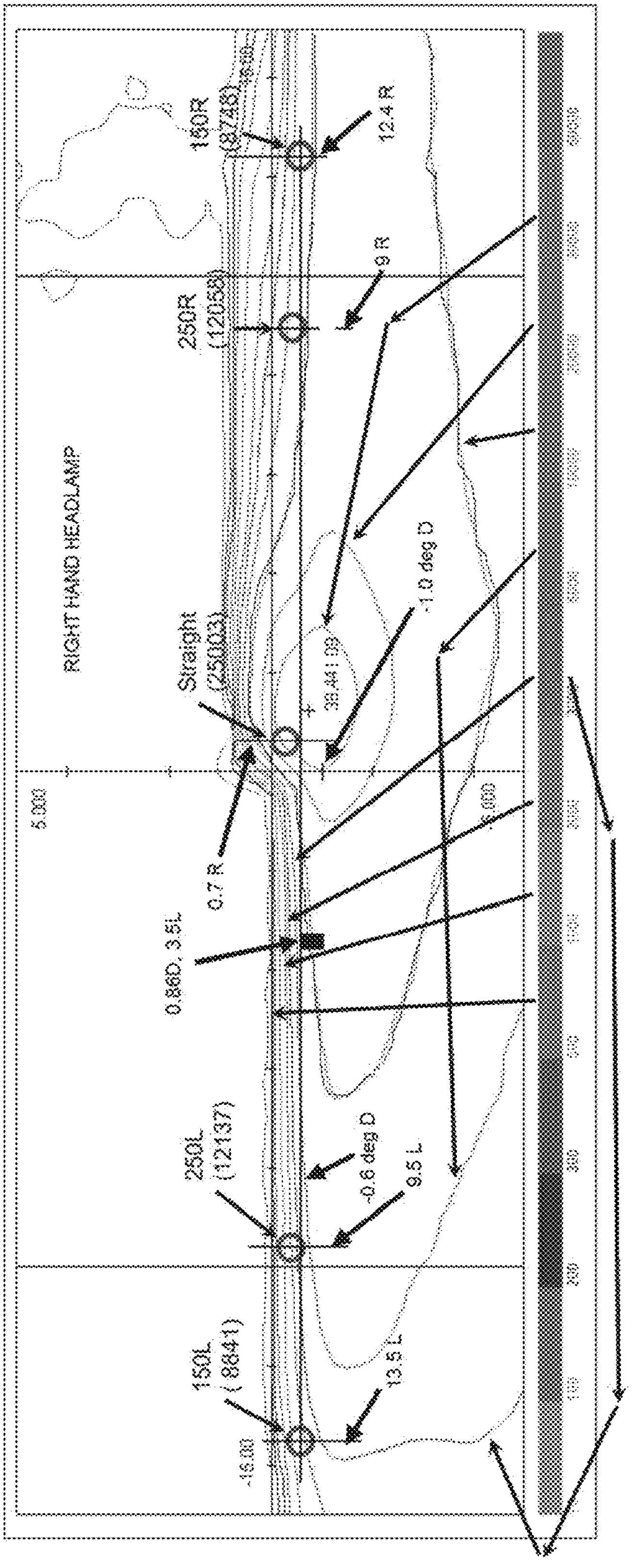
Figure 9:
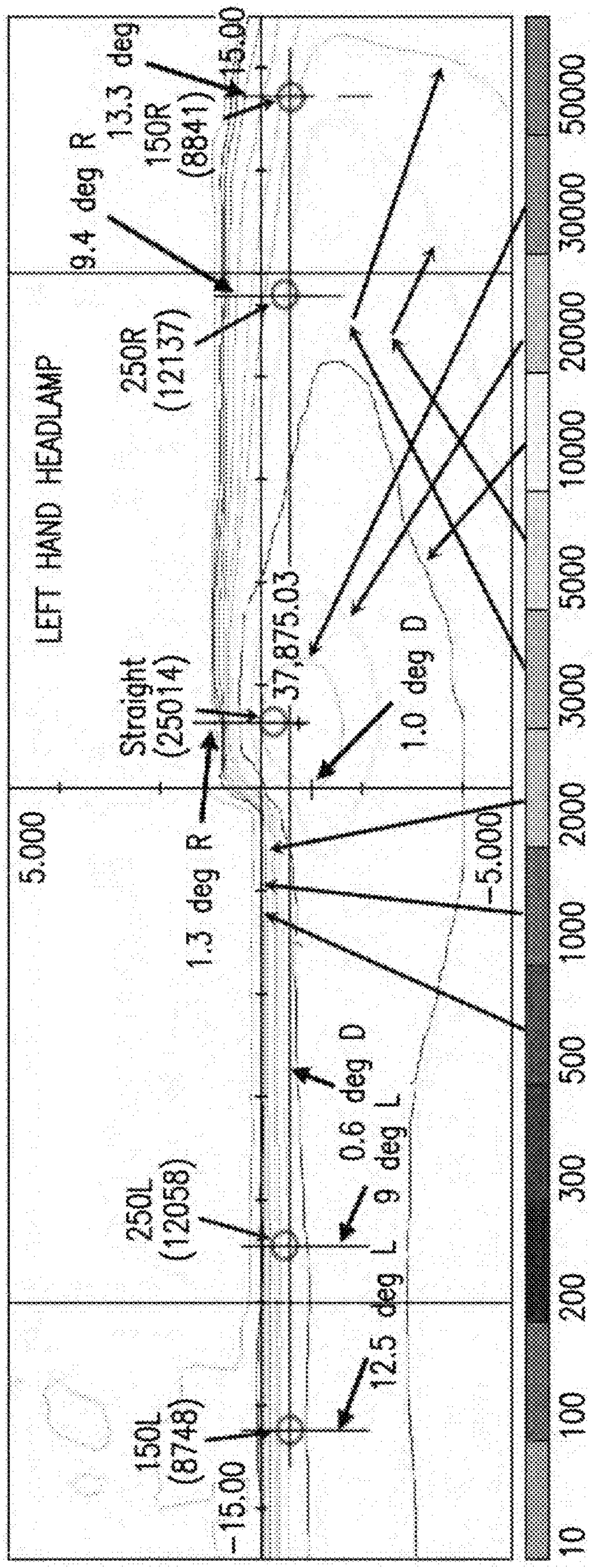
Figure 10:
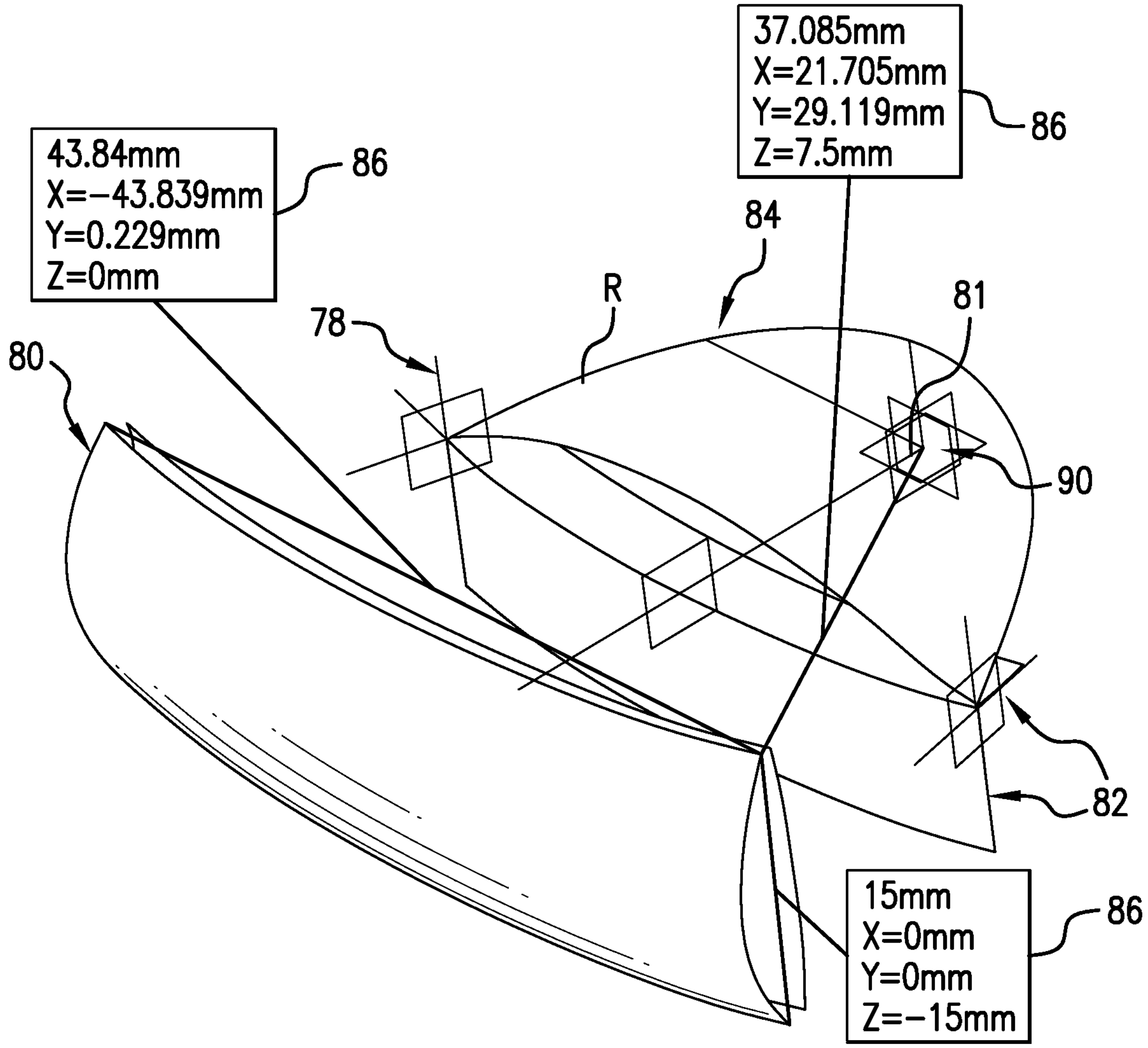
Figure 10A:
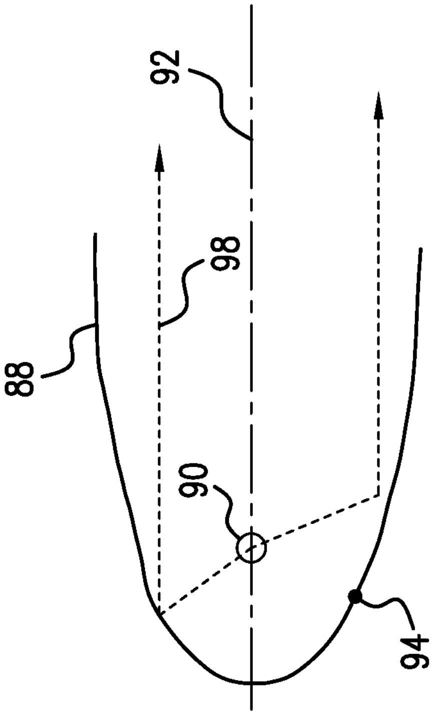
Figure 10B:
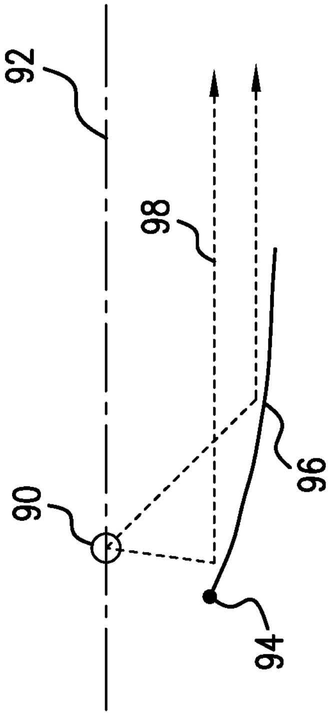
Figure 10C:
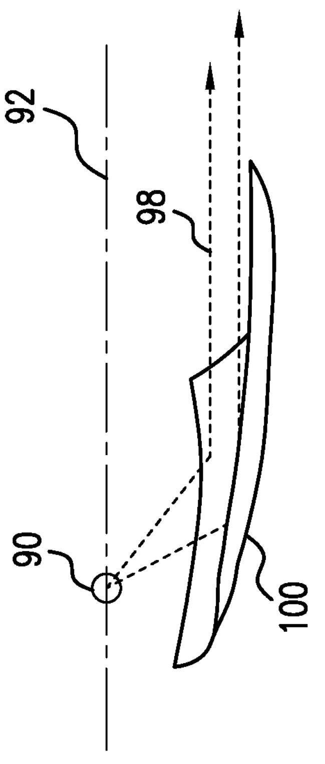
Figure 11:
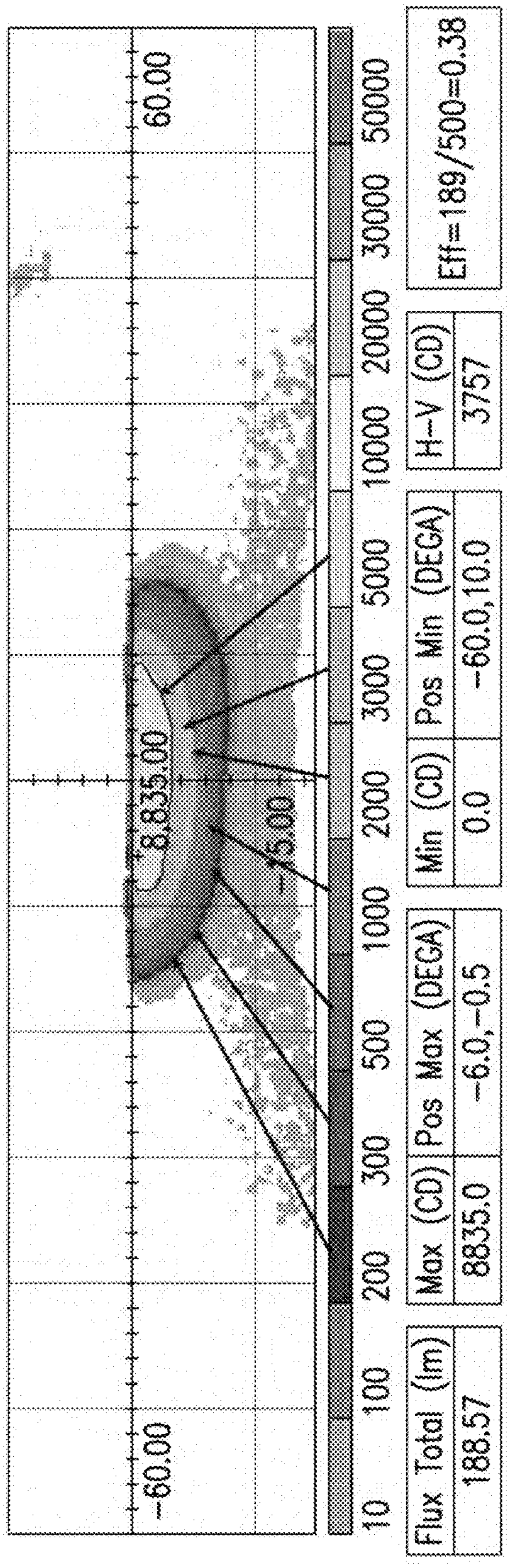
Figure 12:
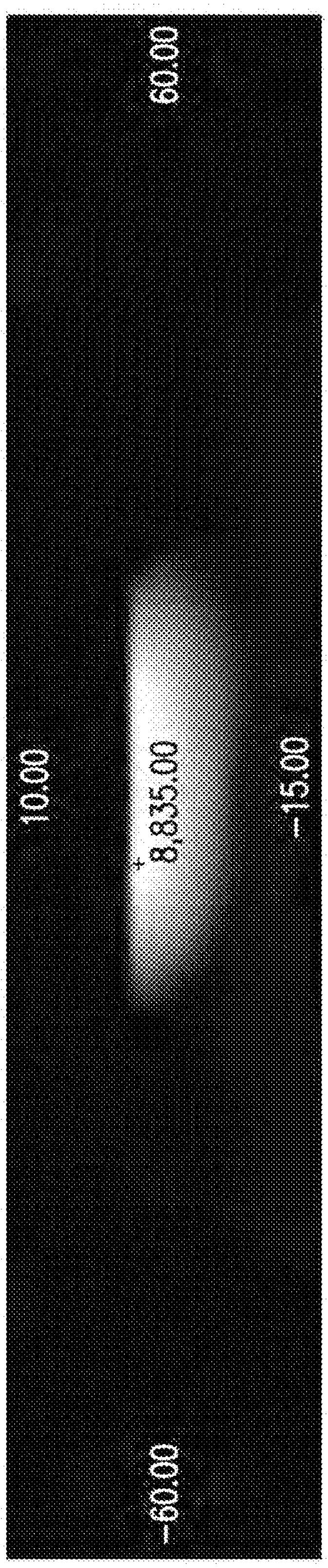
Figure 13:
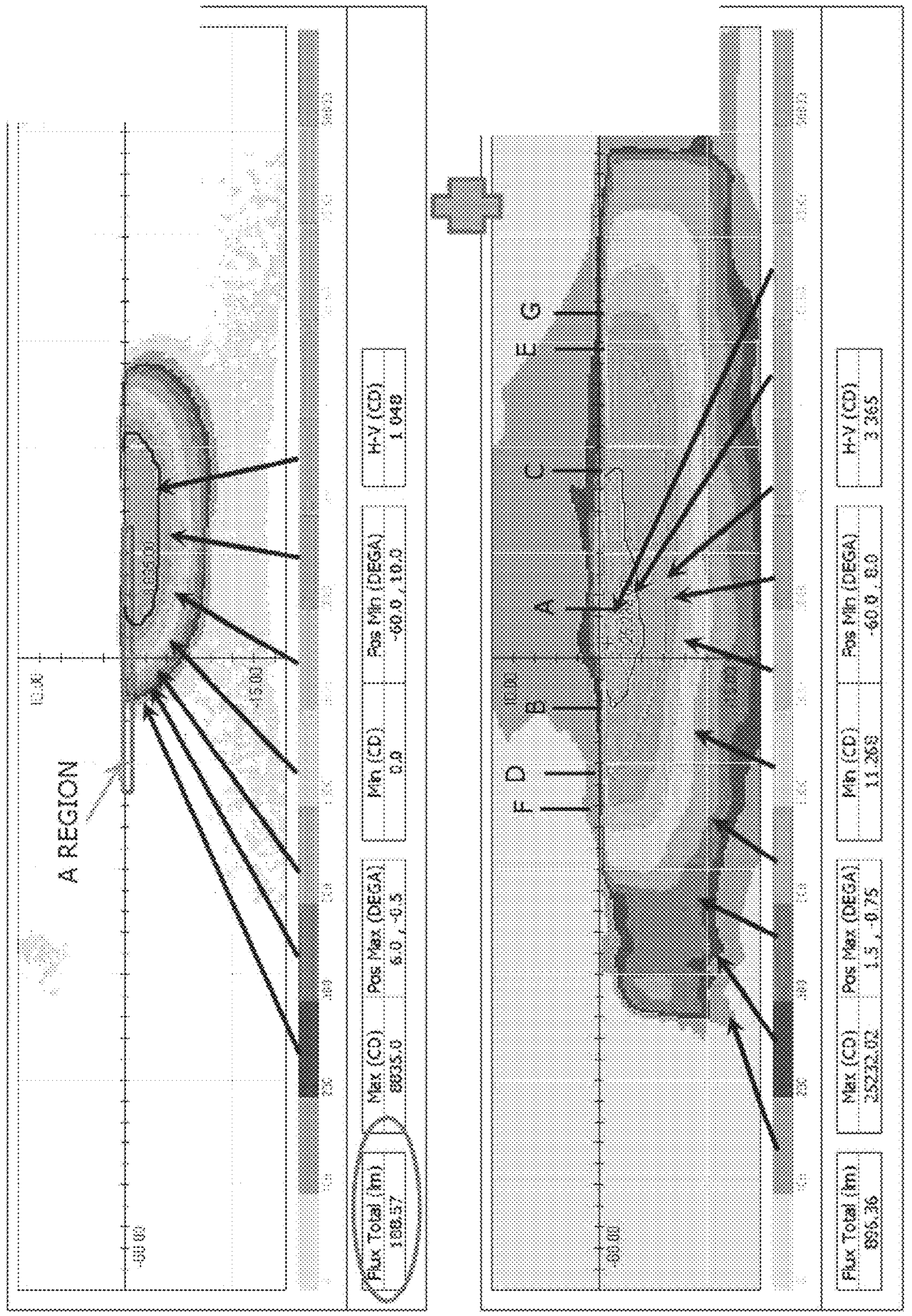
Figure 14:
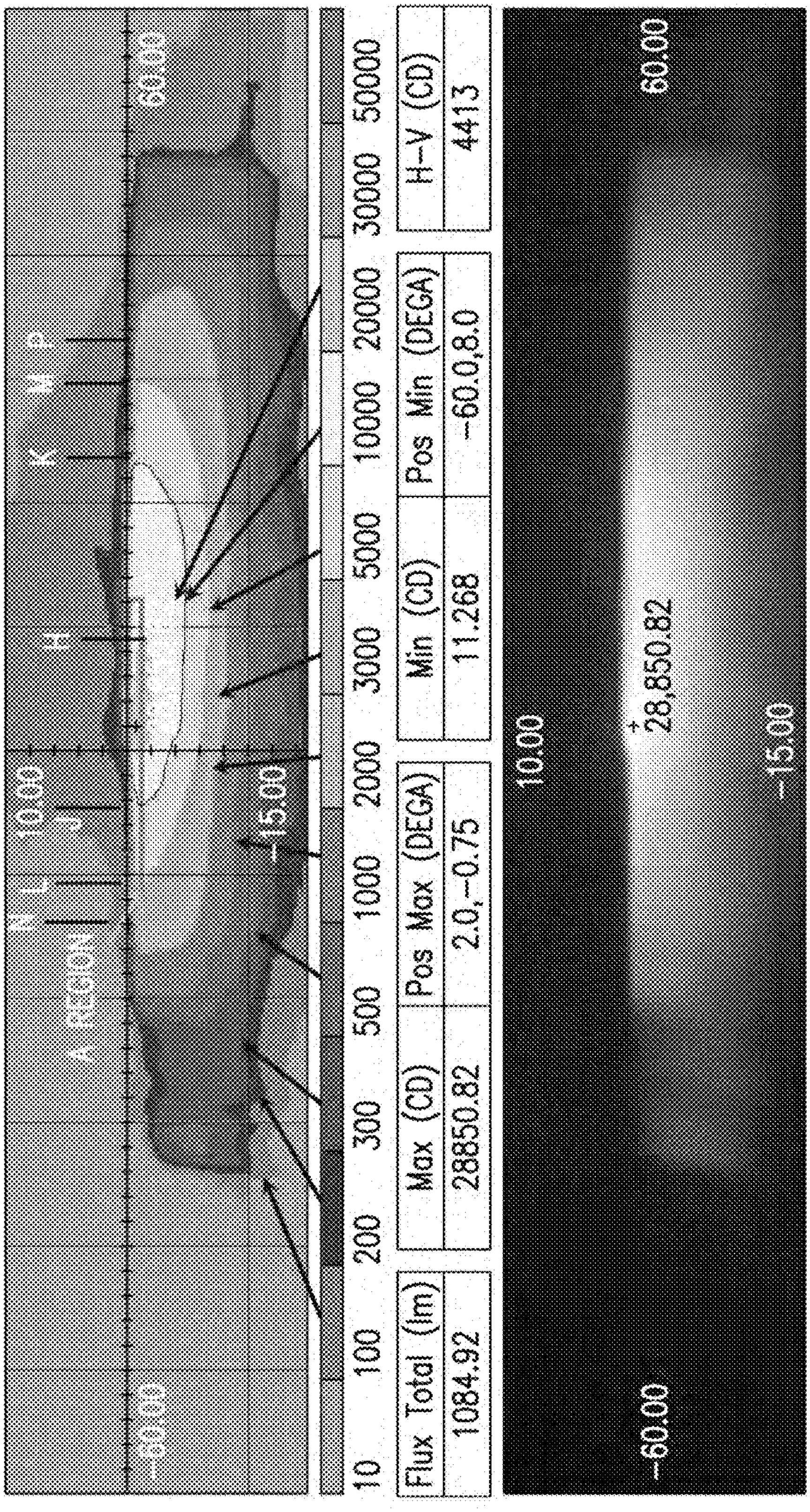
Figure 16:
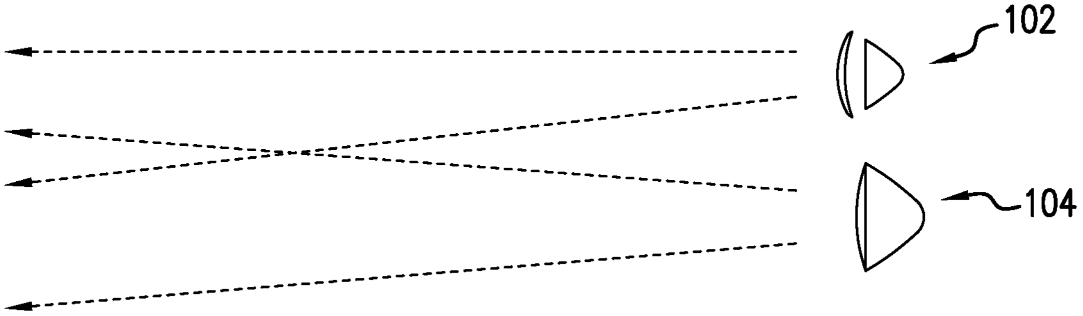
Figure 17:
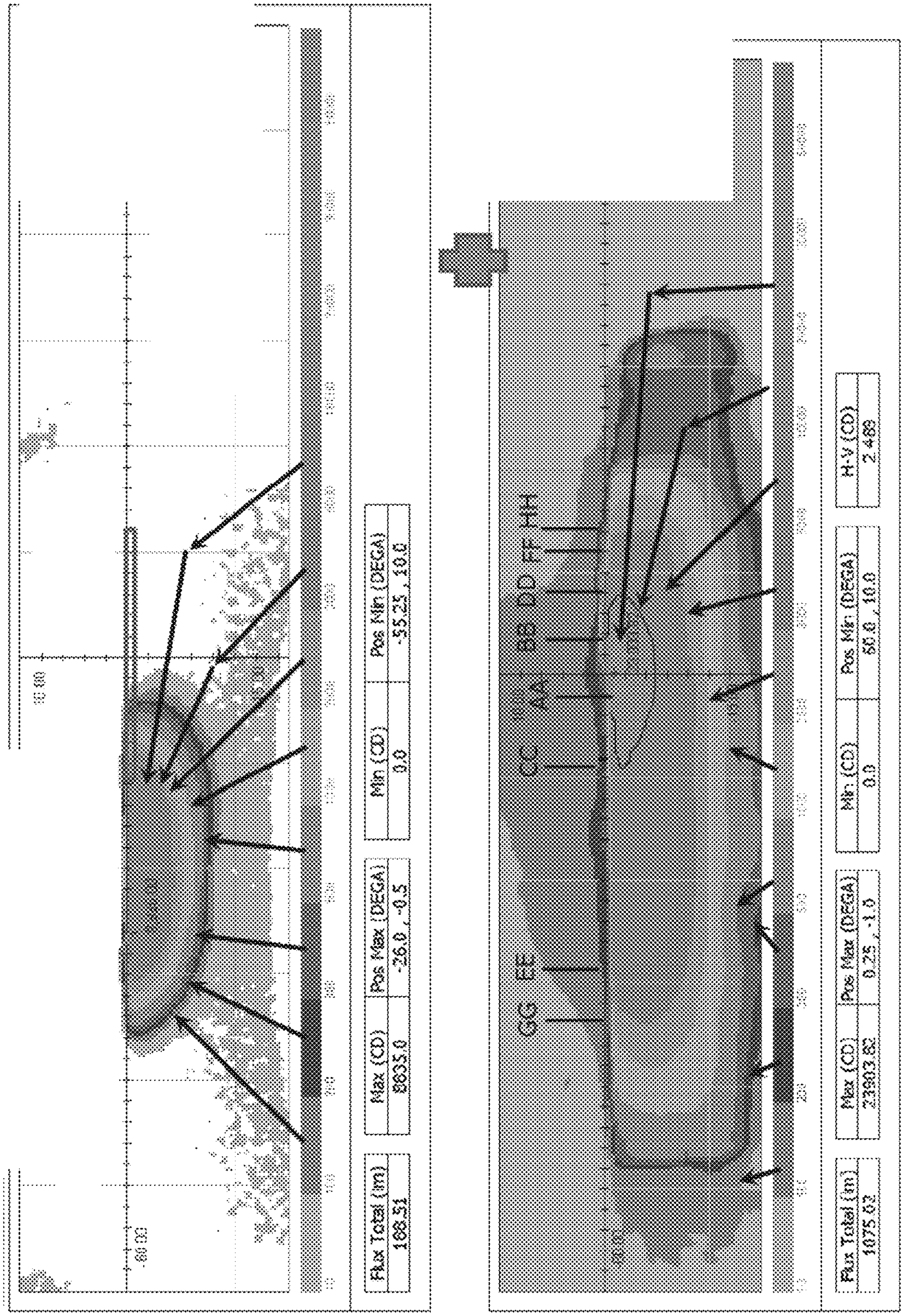
Figure 18:
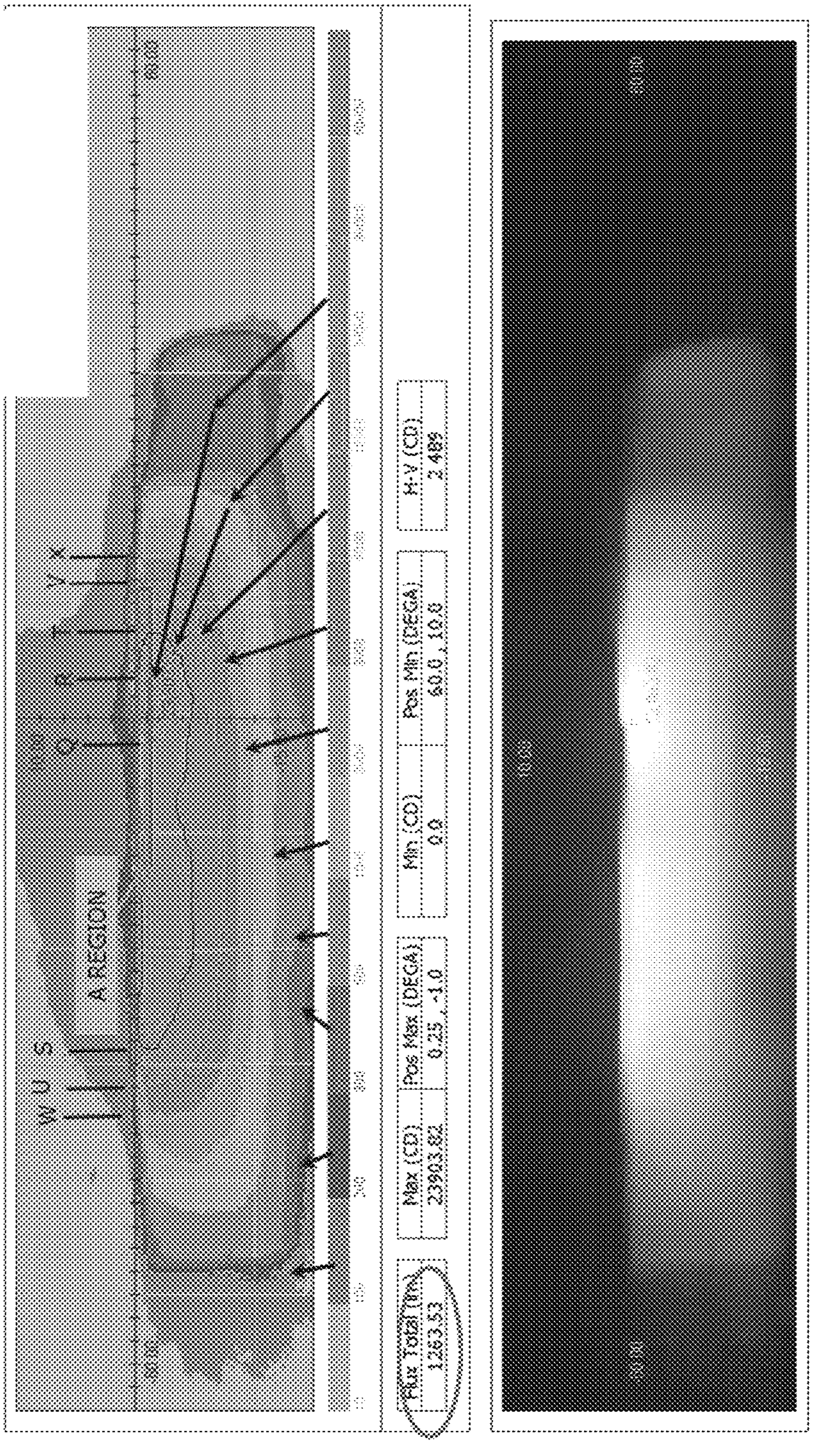
Figure 20:
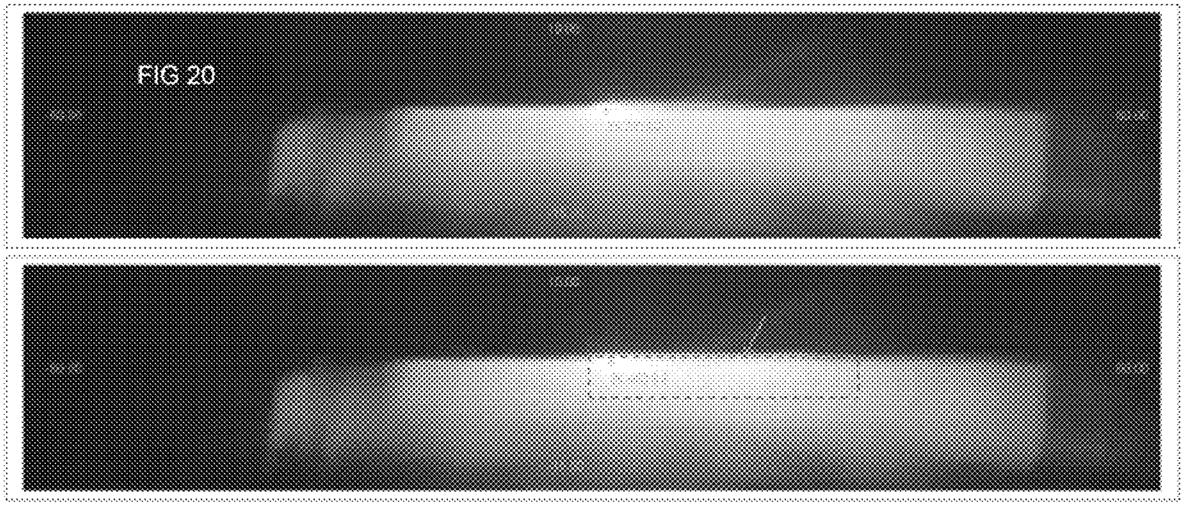
Figure 21:
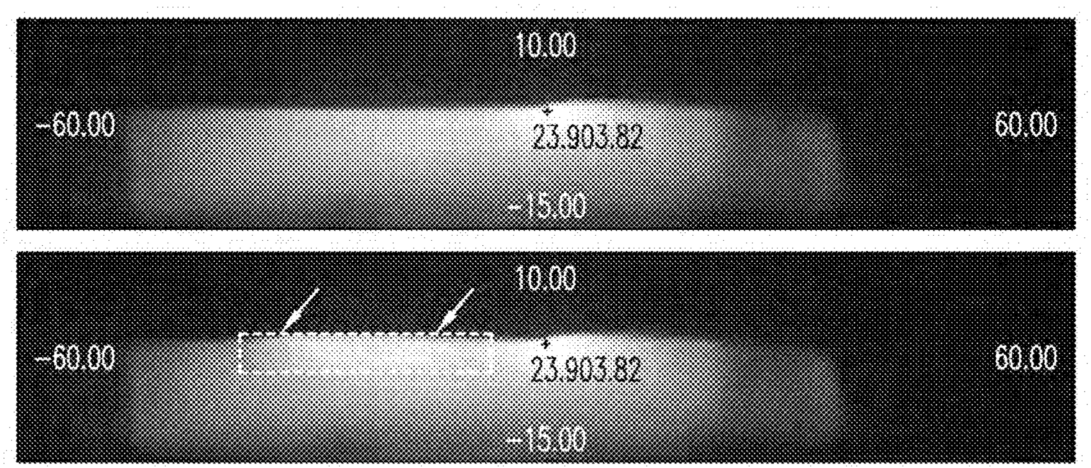
Figure 22:
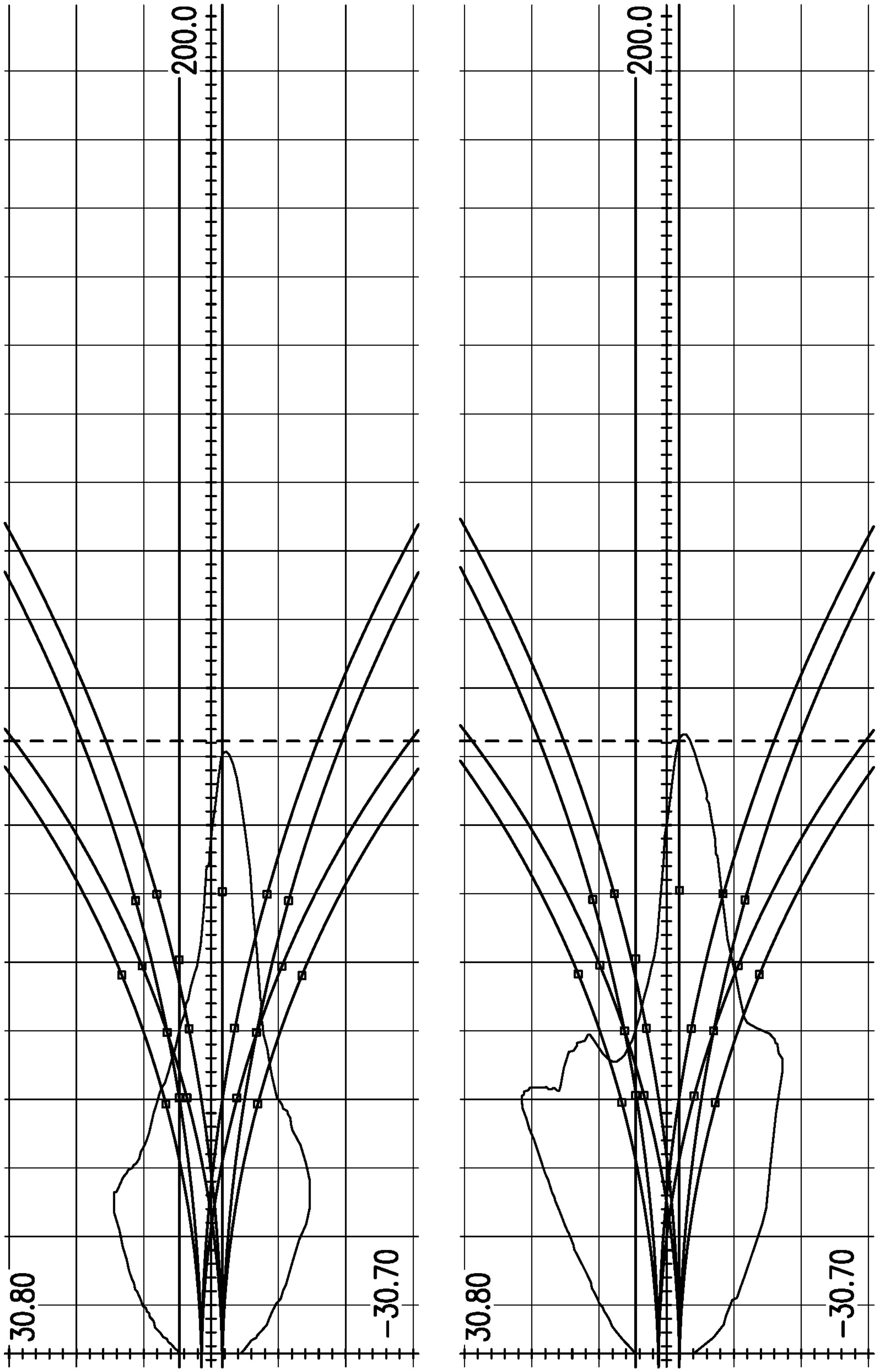
Figure 22A:
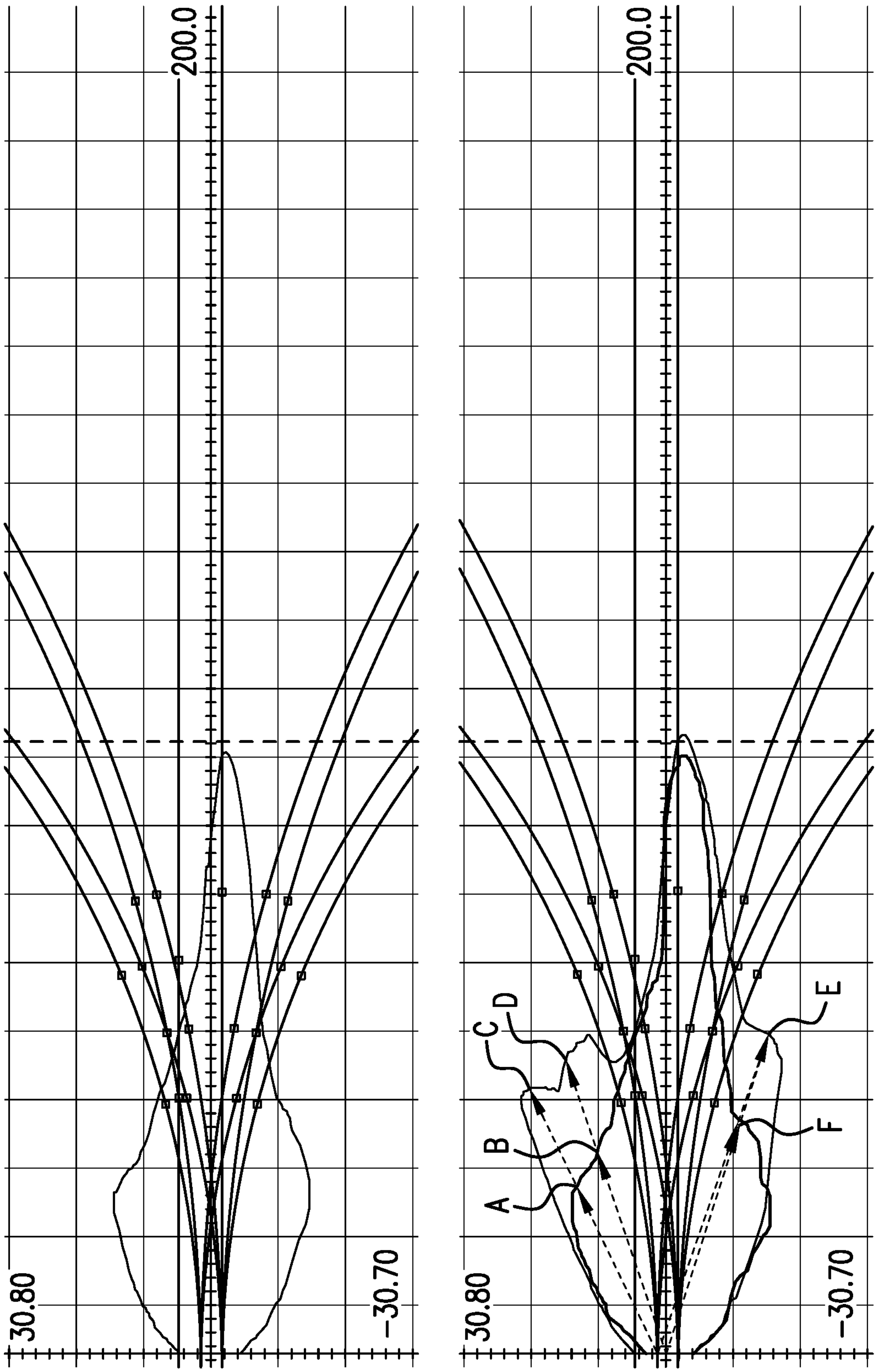
Figure 23:
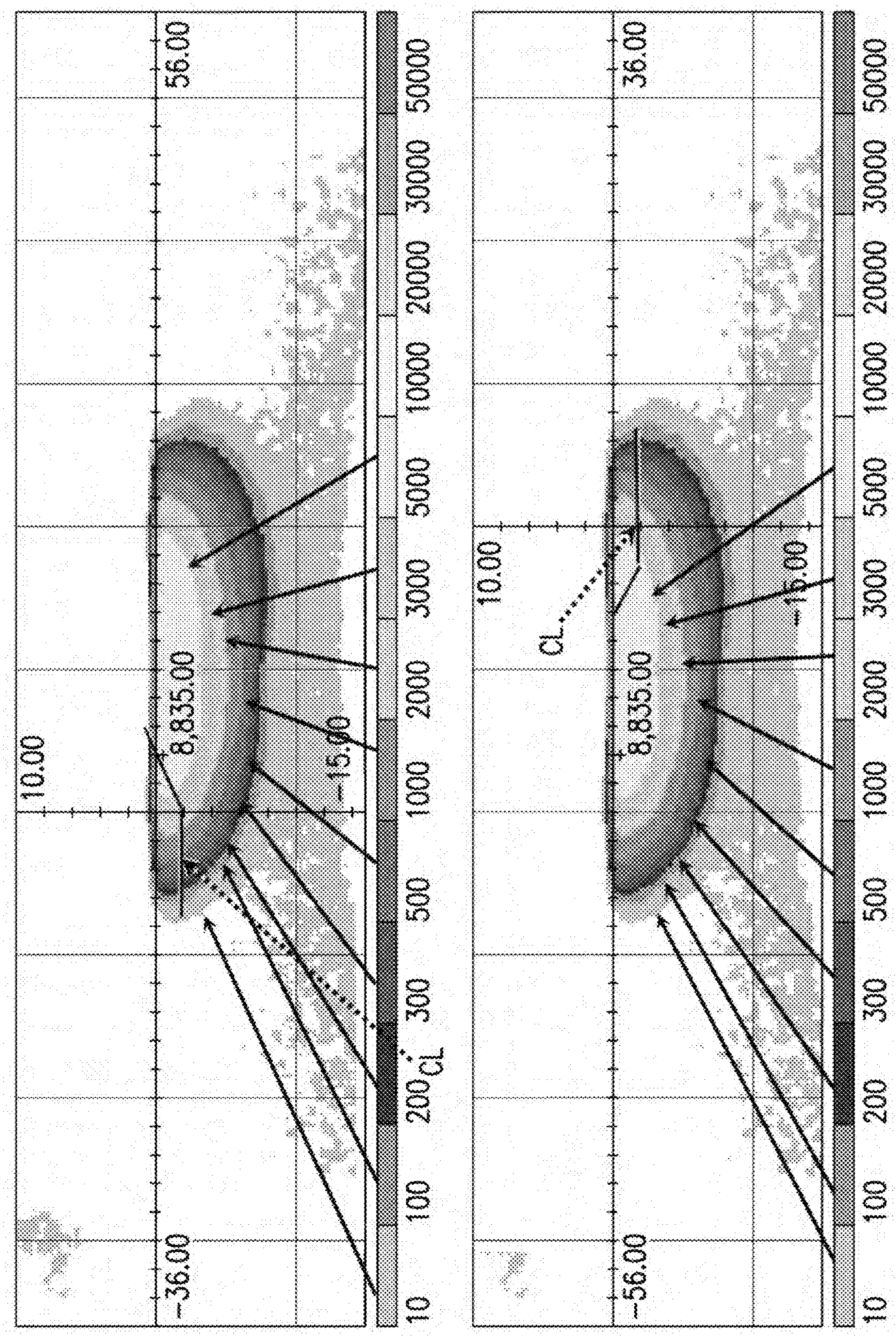
Figure 24:
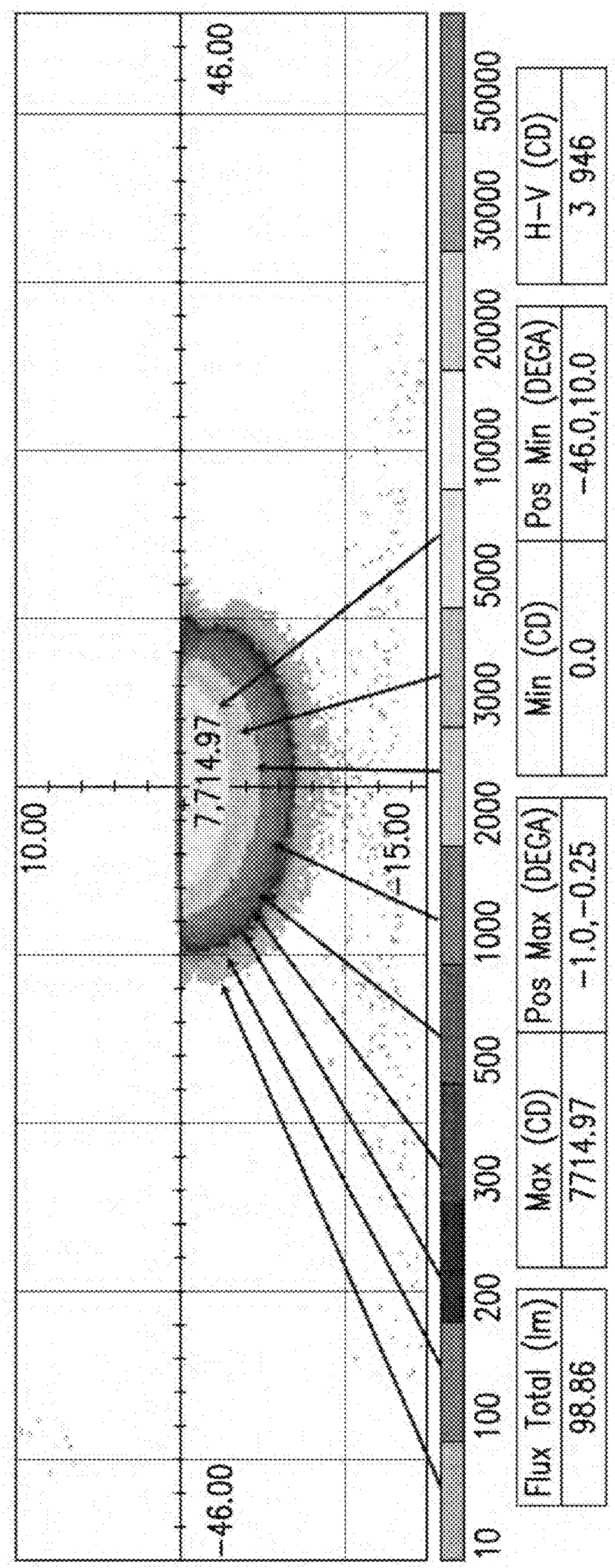
Figure 25:
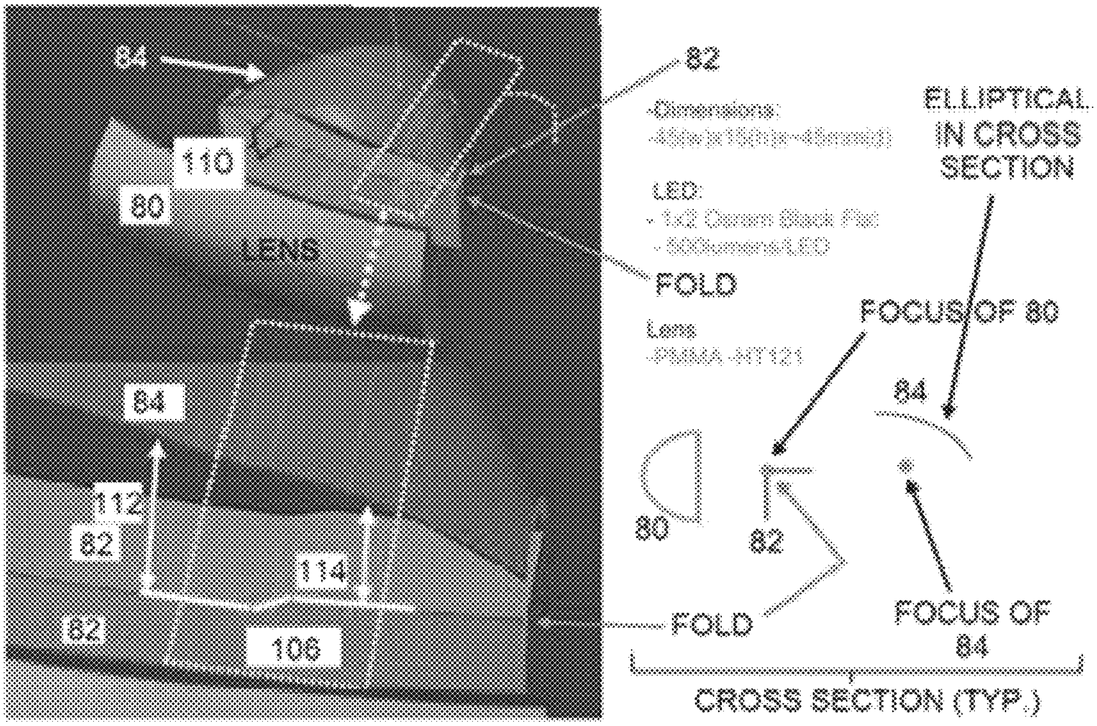
Figure 26:
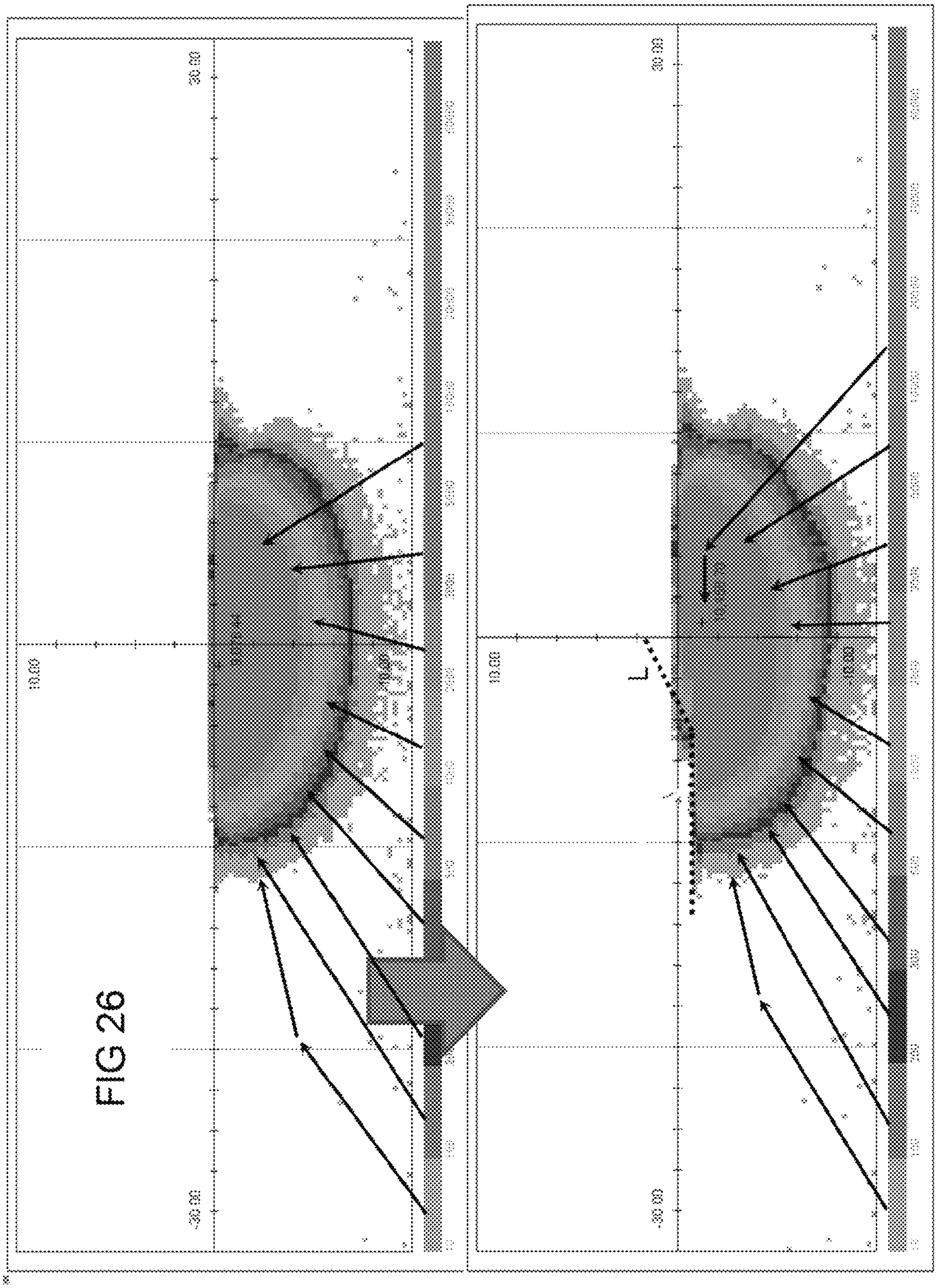
Figure 27:
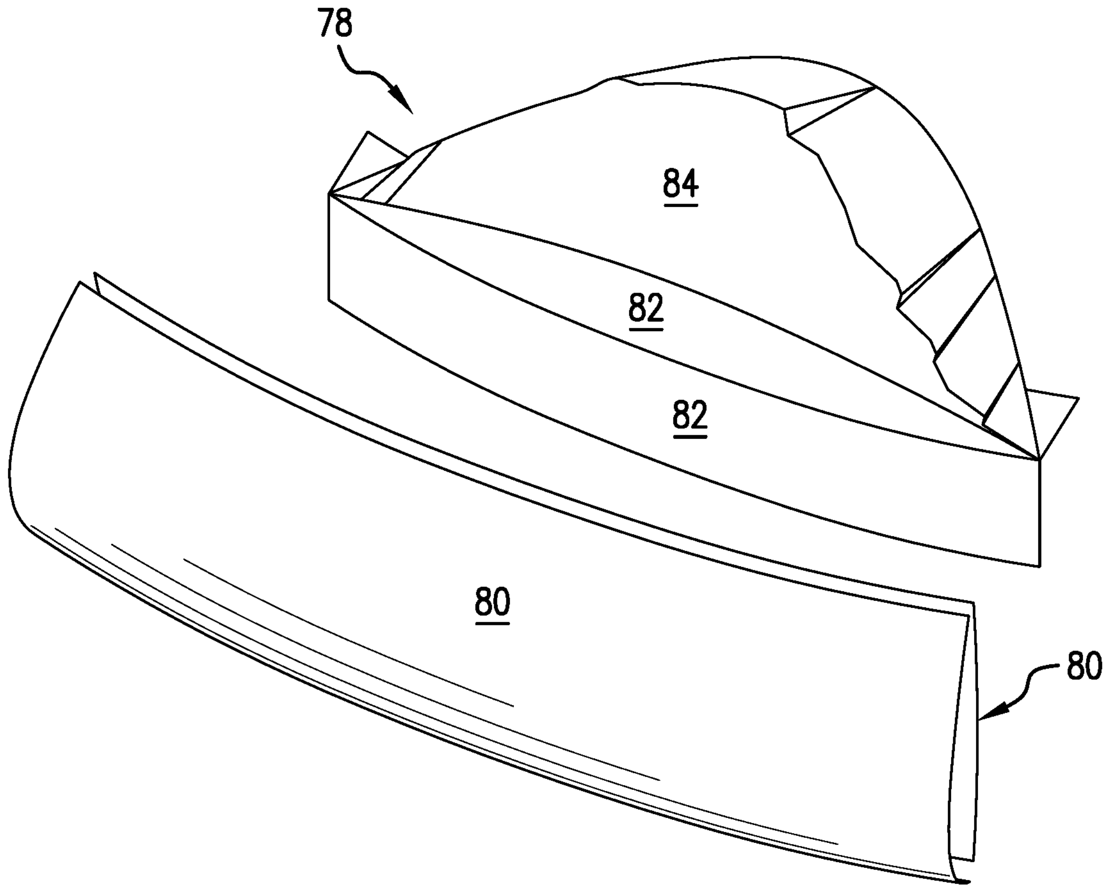
Figure 28:
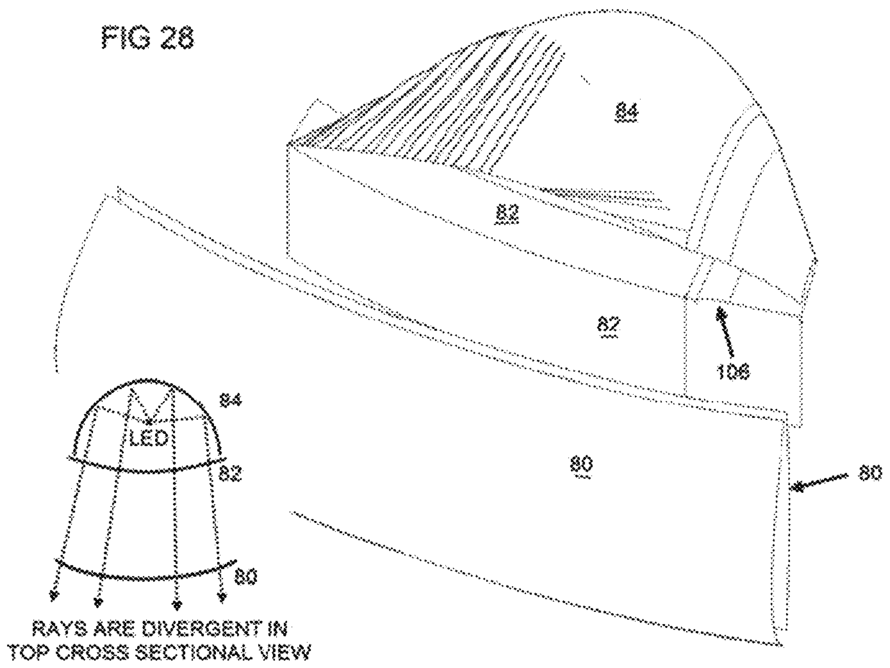
Figure 29:
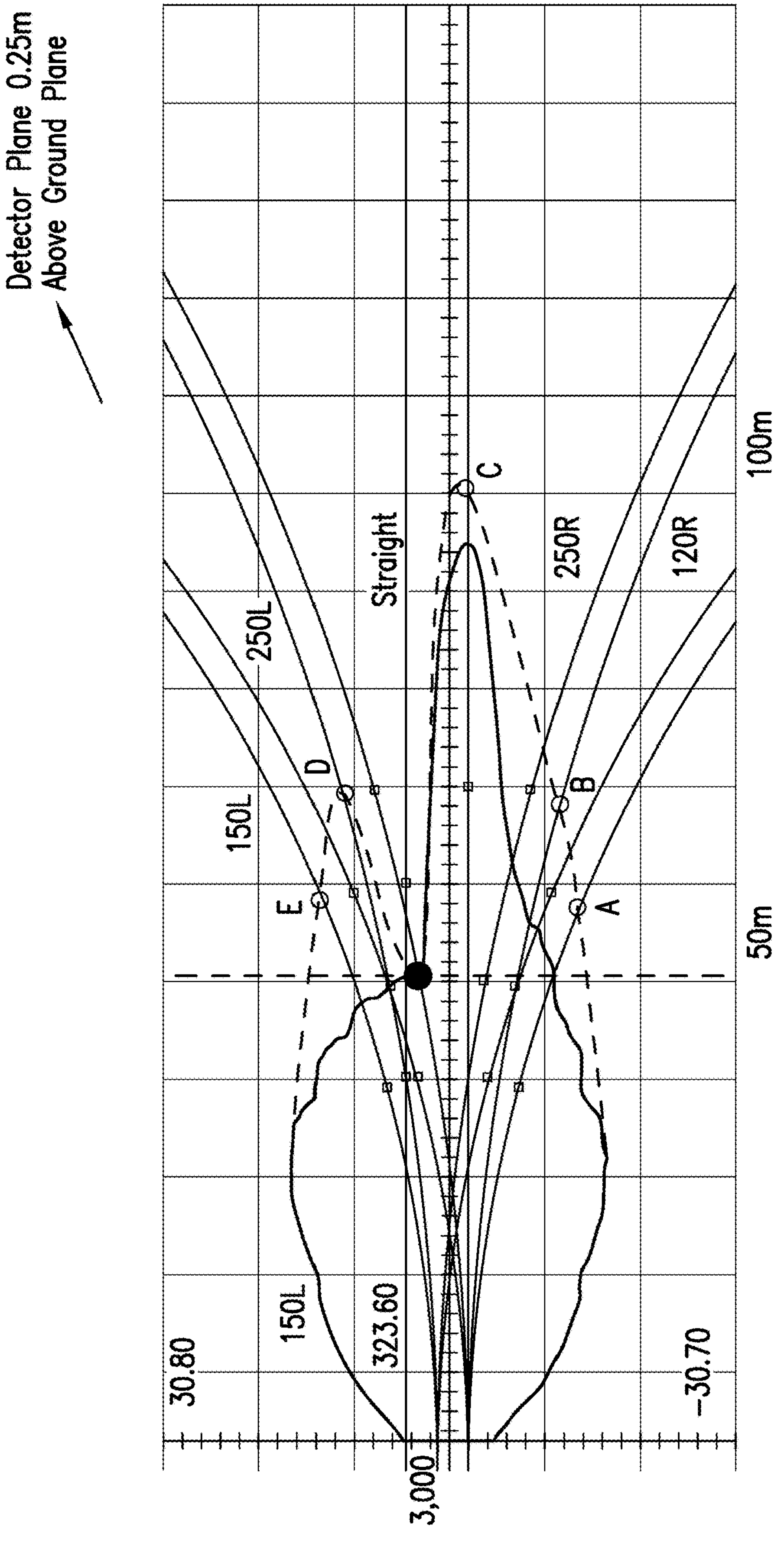
Figure 30:
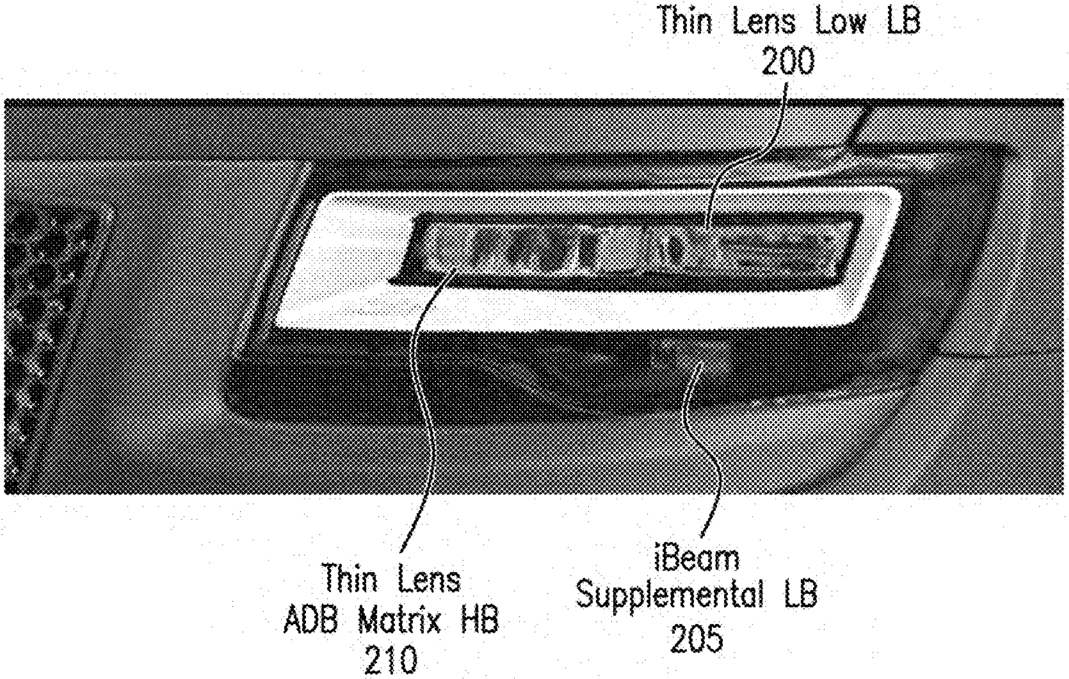
Figure 31:
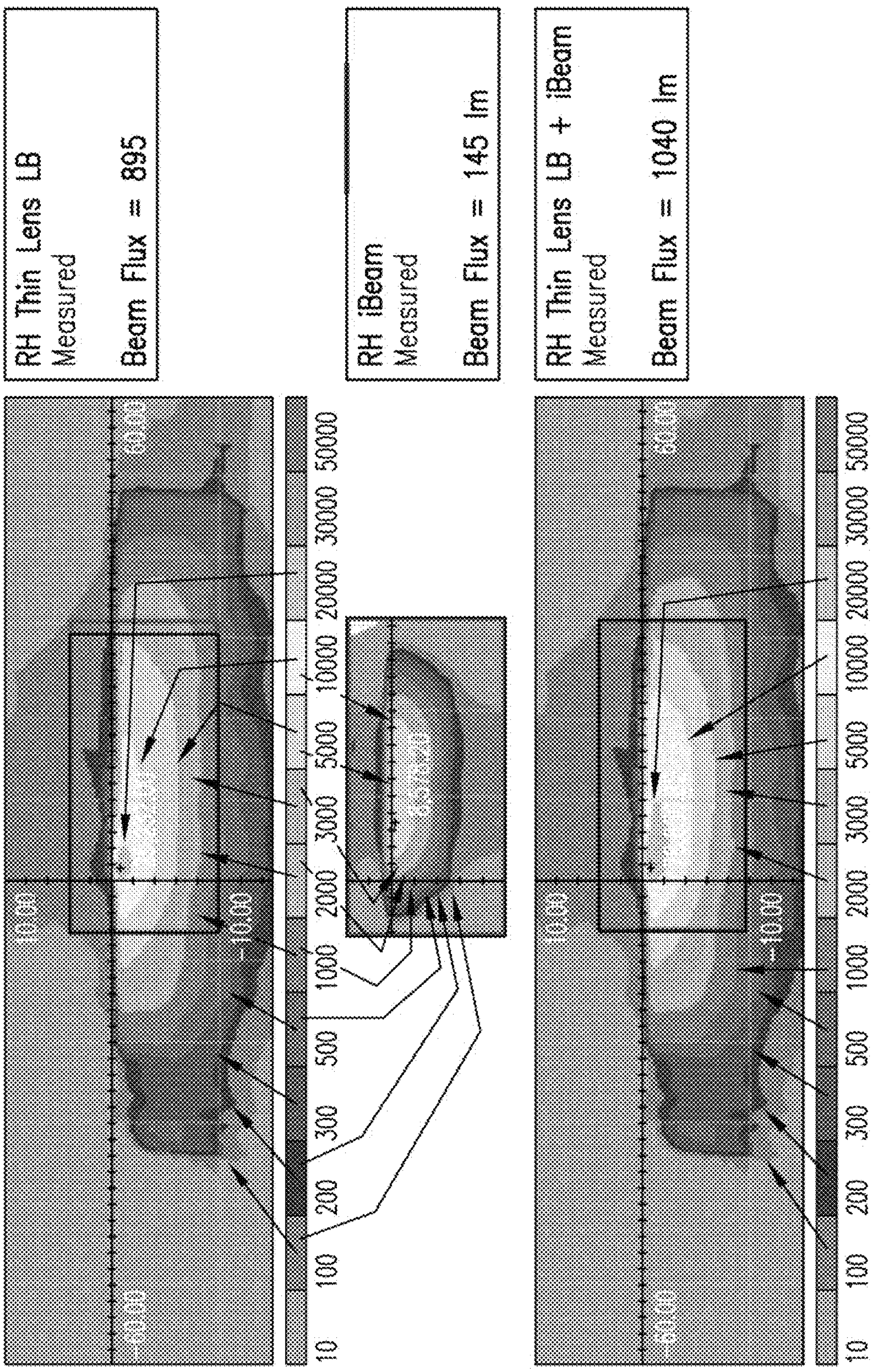
Figure 32:
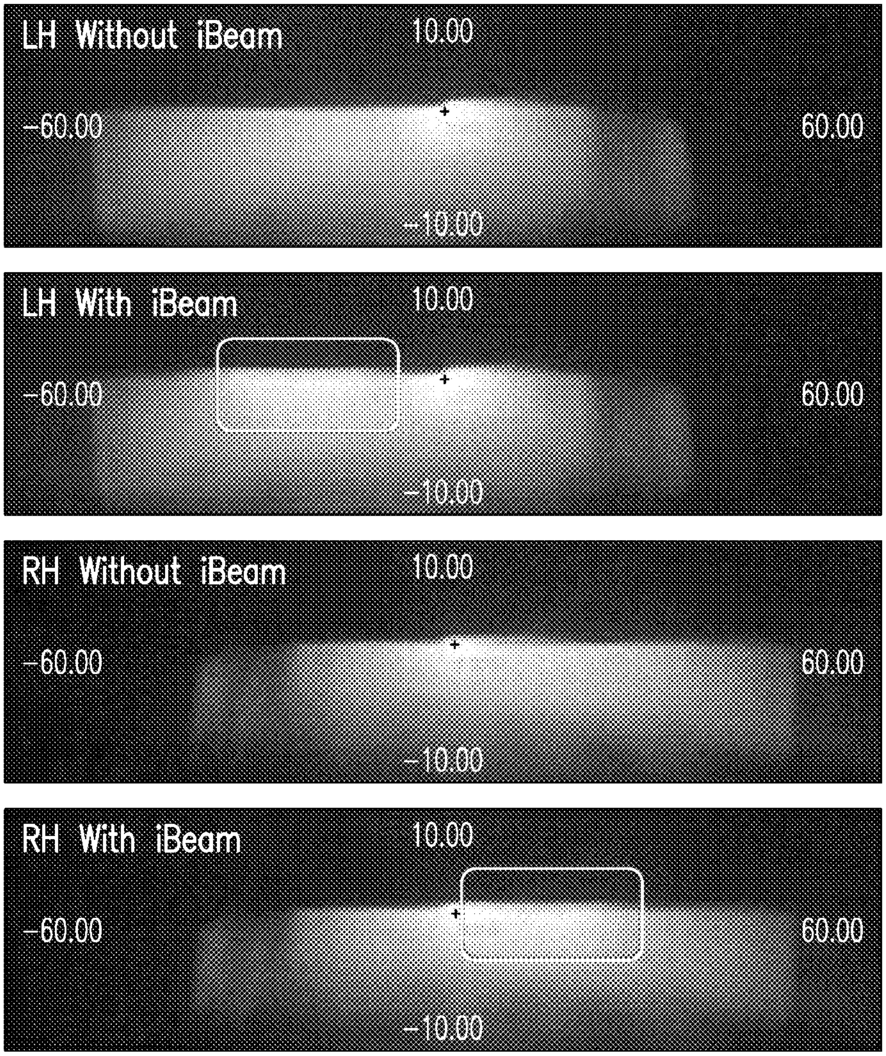
Figure 33:
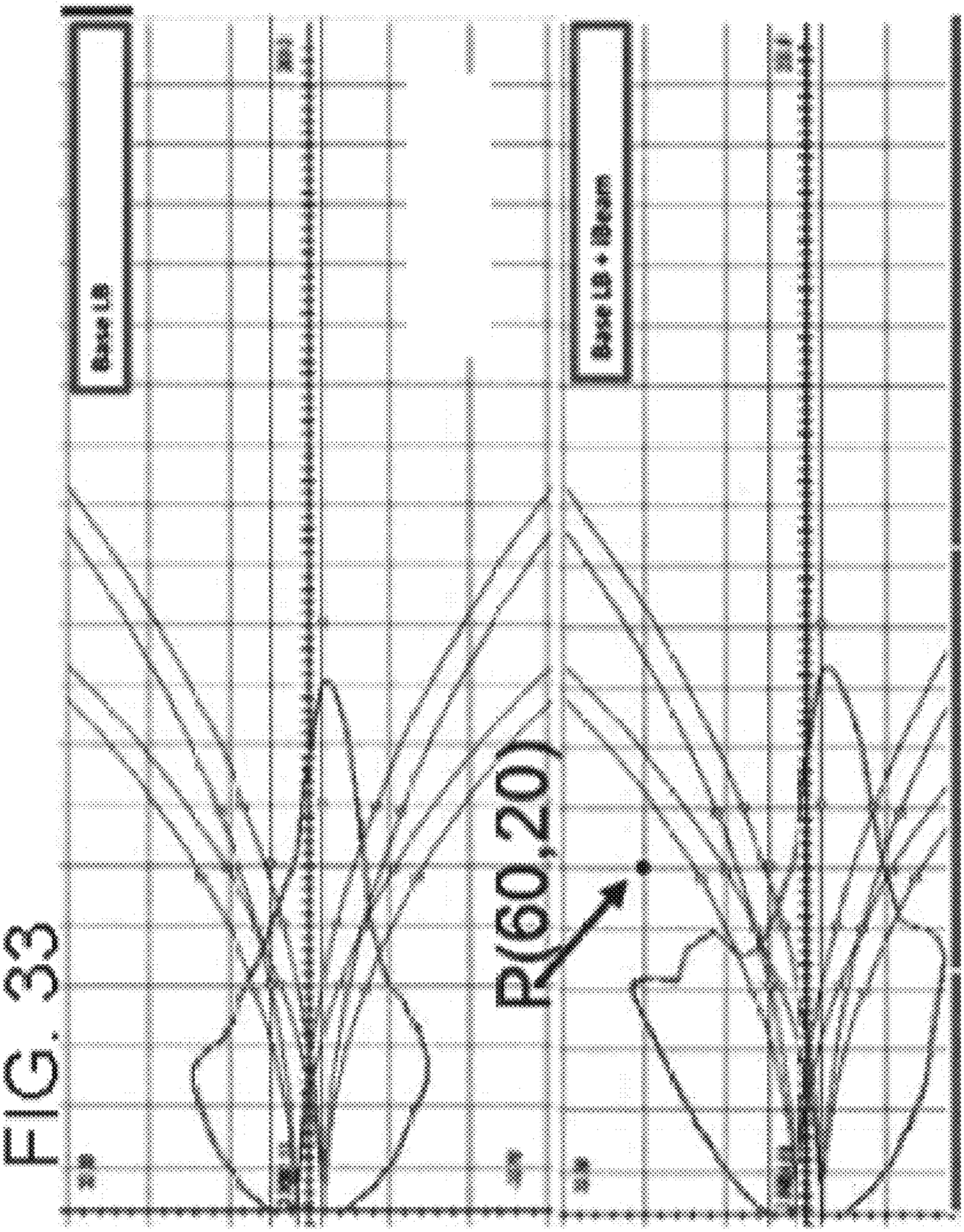
Figure 34:
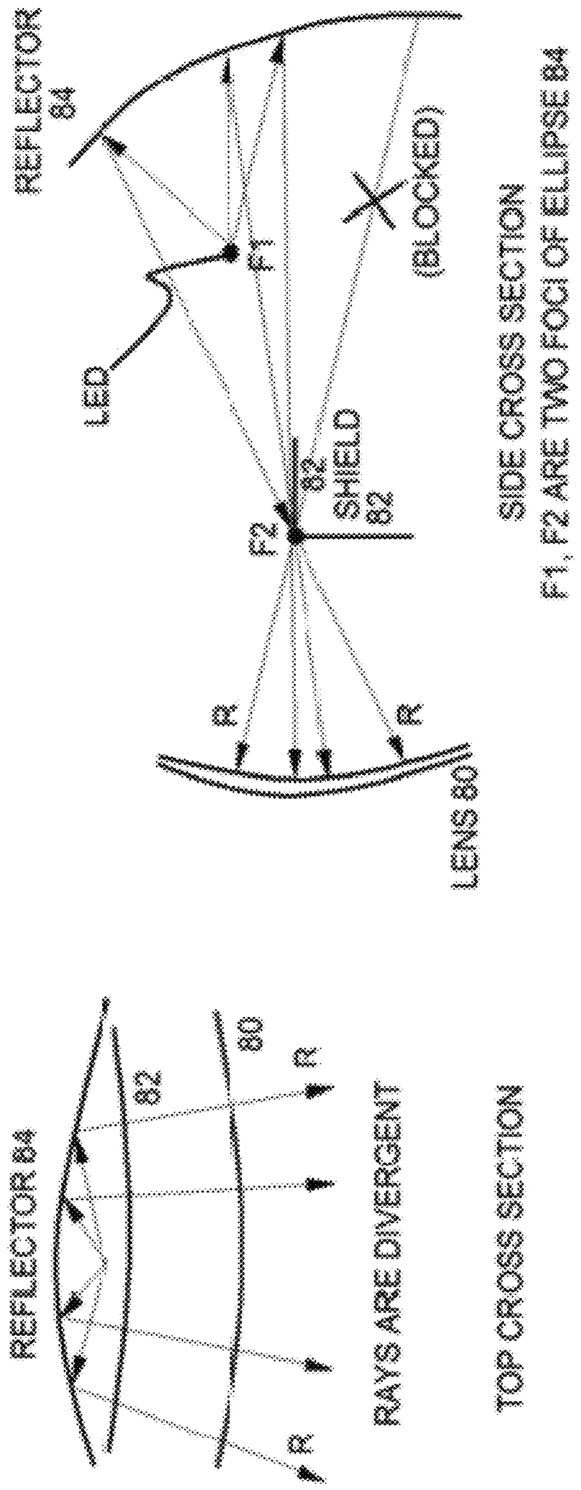
Figure 35:
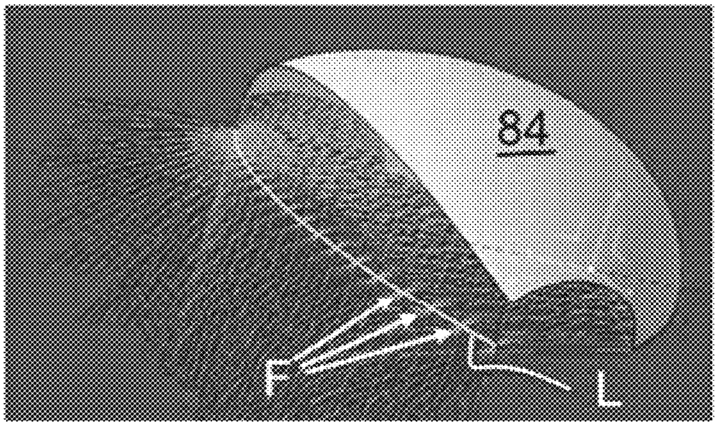
Figure 36:
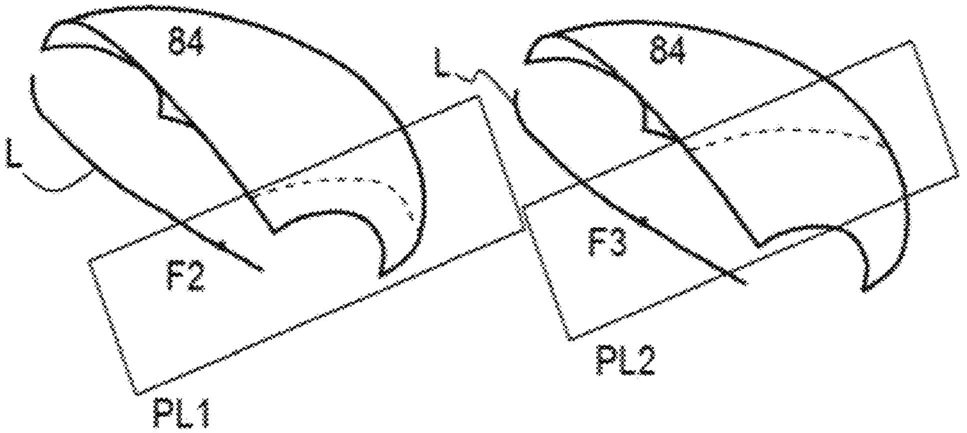
Figure 37A:
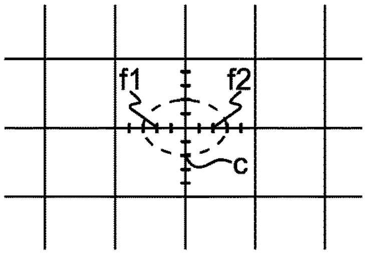
Figure 37B:
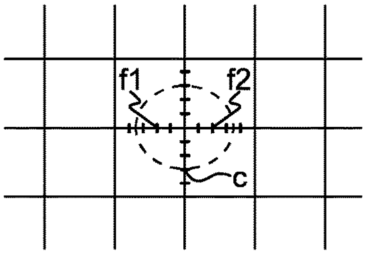
Figure 37C:
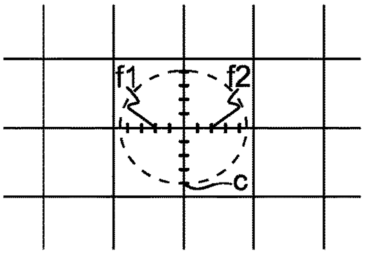
Figure 37D:
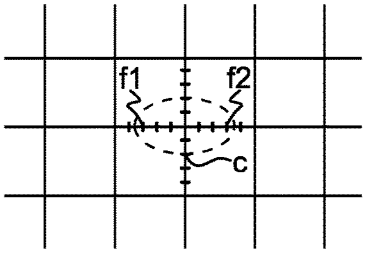
Figure 37E:
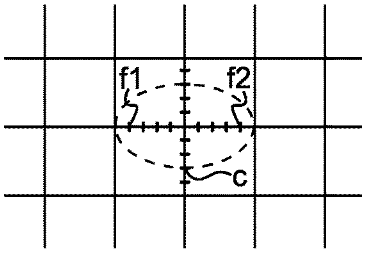
Figure 37F:
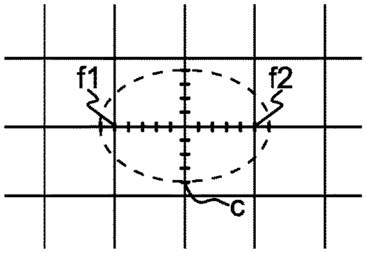
Figure 37G:
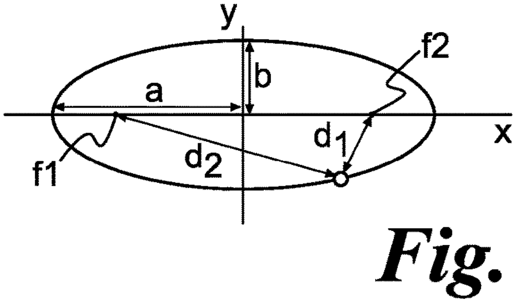

FIG. 3 explains why an edge of a beam is slanted;

FIG. 4 is similar to FIG. 2, but shows the high beam patterns on the same roadways, for the same vehicles;

FIG. 5 is a simplified view of light beams produced by one form of the invention;

FIG. 6 is similar to FIG. 1, with a blank space;

FIG. 7 illustrates how beams can be developed;

FIG. 8 is an intensity plot according to one form of the invention, for a headlamp used on the right side of a vehicle;

FIG. 9 is an intensity plot according to one form of the invention, for a headlamp used on the left side of a vehicle;

FIG. 10 illustrates a structure which can produce the light beams described herein;

FIGS. 10A, 10B, and 10C illustrate functioning of the reflector in FIG. 10;

FIG. 11 is an intensity plot of a light beam produced by an apparatus of the type shown in FIG. 10;

FIG. 12 is a greyscale intensity plot corresponding to the plot of FIG. 11;

FIG. 13 shows two intensity plots with the upper plot corresponding to that of FIG. 11 and is of an auxiliary lamp; the lower plot is that of a standard headlamp and both are used on the right side (i.e., passenger side) of a vehicle; the A REGION indicates illumination which may be cut out, as by the STEP in FIG. 25;

FIG. 14 is an intensity plot which results when the plots of FIG. 13 are combined;

FIG. 15 gives data in table format, which describes the plot of FIG. 14;

FIG. 16 illustrates how the lamps L1 and L2 can be arranged to produce the composite beam of FIG. 14;

FIG. 17 shows two intensity plots with the upper plot is produced by an auxiliary headlamp and the lower plot is that of a standard headlamp, both being used on the left side of a vehicle;

FIG. 18, top, is an intensity plot which results when the plots of FIG. 17 are combined and FIG. 18, bottom, is a greyscale rendition of the plot;

FIG. 19 gives data in table format, which describes the plot of FIG. 18;

FIG. 20 shows two greyscale plots with the top one corresponding to a standard right-side headlamp and the bottom one corresponding to a standard right-side headlamp augmented by a lamp according to the invention;

FIG. 21 shows two greyscale plots with the top one corresponding to a standard left-side headlamp and the bottom one corresponding to a standard left-side headlamp augmented by a lamp according to the invention;

FIG. 22, top, shows an ordinary headlamp beam, while FIG. 22, bottom, shows a headlamp beam according to the invention;

FIG. 22A emphasizes features of FIG. 22;

FIG. 23 shows an intensity pattern produced by the apparatus of the type shown in FIG. 10, and how modifications to the apparatus will cut, or block, sections of the beam;

FIG. 24 is an intensity plot of the type produced by the apparatus of FIG. 25;

FIG. 25 illustrates how a STEP produced in the stop or block will produce a cutout in a beam, as shown in FIG. 26;

FIG. 26 illustrates an intensity pattern produced by the apparatus of FIG. 25;

FIG. 27 illustrate a view of the apparatus of FIG. 10;

FIG. 28 illustrates a view of the apparatus of FIG. 25;

FIG. 29 illustrates locations A, B, C, D, and E where intensity should reach 5 lux; the dashed line represents one type of composite light beam, produced by the headlamps of FIG. 16 together; the solid line represents an ordinary low beam; the squares are 10 by 10 feet each (3×3 meters);

FIG. 30 illustrates headlamps on an automobile, which include a low beam, LB, 200, high beam, HB, 210 and an auxiliary lamp 205 according to one form of the invention;

FIG. 31 illustrates projection patterns of a representative low beam 200 of FIG. 30, a representative auxiliary lamp 205, and a combination of lamps 200 and 205;

FIG. 32 illustrates monochrome patterns of the type shown in FIG. 31;

FIG. 33 is a bird's eye view of the beams projected by lamps 200 and 205;

FIG. 34 is a simplified schematic of elements utilized by the invention;

FIGS. 35 and 36 illustrate a reflector 84, and a line L across which are distributed local second foci F; with FIG. 36 showing cross sectional planes PL2 and PL3;

FIGS. 37A-37F illustrate progressive development of ellipses of different size to illustrate a reflective behavior of reflector 84;

FIG. 37G illustrates well-known equations of the ellipse; and

Figure 38:
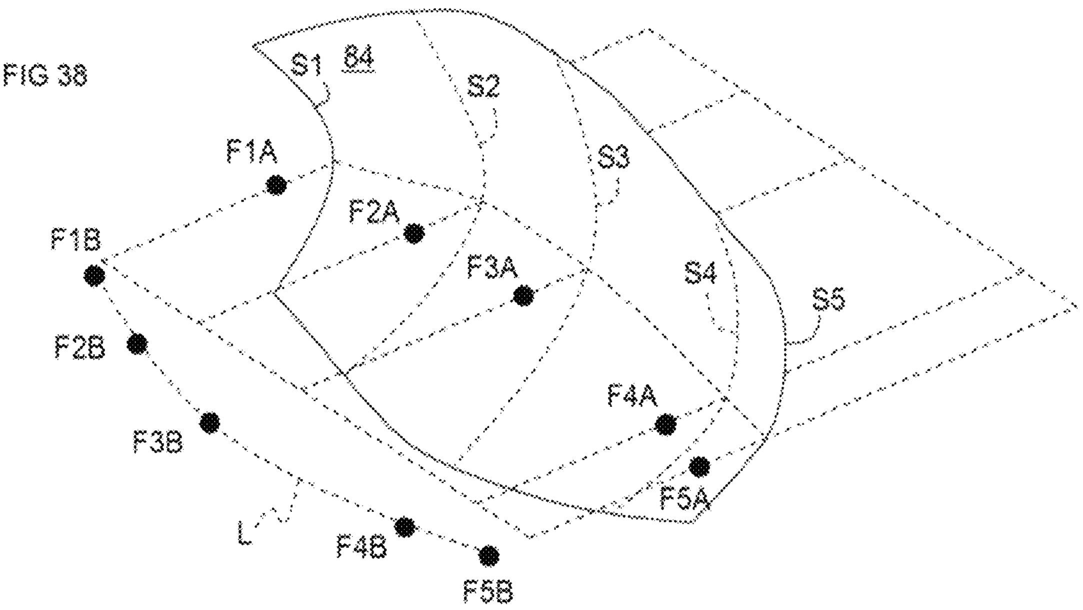

FIG. 38 is a simplified rendition of reflector 84, showing how line L in FIG. 35 can be developed.

DETAILED DESCRIPTION OF THE PREFERRED EMBODIMENTS

FIG. 1 is a simplified overhead view of a vehicle 10 on a roadway 12 and shows the headlight beam 14 projected by the vehicle 10. The headlight beam 14 represents a low beam, as opposed to a high beam which projects light farther.

FIG. 2 represents five roadways, 16, 18, 20, 22 and 24. These five roadways 16, 18, 20, 22 and 24 represent five diverging paths which a single roadway can take. They show how headlamps of five vehicles 26, 28, 30, 32 and 34 illuminate the respective roadways 16, 18, 20, 22 and 24 in five different ways. These illumination patterns are purely generic and different vehicles will illuminate the roadways in ways which differ from those illustrated.

Roadway 16 curves upward (as viewed in FIG. 2) with a radius of 150 meters, as indicated by the callout R=150. Roadway 18 curves upward with a radius of 250 meters. Roadway 20, in the center of FIG. 2, is straight. Roadway 22 curves downward with a radius of 250 meters, and Roadway 24 curves downward with a radius of 150 meters.

The hatched areas represent the illumination patterns which the beam 14 in FIG. 1 casts upon the roadways 16, 18, 20, 22 and 24 in FIG. 2. Regarding the curved roadways 16, 18, 22 and 24, the hatched patterns indicate how the roadways 16, 18, 22 and 24 are illuminated at specific times, namely, when the vehicles 26, 28, 30, 32 and 34 in FIG. 2 are about to enter a curved roadway. Of course, as a vehicle travels along a curved roadway after entering, the illumination pattern on the roadway will change from that shown as the vehicle moves as is illustrated in FIG. 2.

The leading edges of the illumination patterns, such as edge 36 in FIG. 2, are not square with the roads because of the shape of the beam 14 in FIG. 1. For instance, in FIG. 3, the slanted edge 38 has that slanted shape because it follows the edge of the beam 14, which is located in region 40. For clarity, region 40 is not shown located over edge 38, as it would be ordinarily.

In FIG. 2, the low beams in the upper curved roadways do not extend as far as the corresponding beams in the lower curved roadways. For instance, edge 42 is closer to vehicle 28 than edge 36 is to vehicle 32. One reason for this is the asymmetric nature of the beam 14 in FIG. 1. Blank region 44 in FIG. 1 corresponds roughly to the blank region 46 ahead of edge 42 in FIG. 2, which accounts partly for the different extensions of the beams to edges 42 and 36.

The beam 14 in FIG. 2 is constructed to project minimal light or no light through blank region 44 in order to prevent dazzling of oncoming drivers.

It can be desirable to extend the range of the low beams LB to the hatched blocks labeled DLB which stands for "DESIRED EXTENT OF LOW BEAMS." For the roads of radius 150 meters, those dashed blocks are approximately 200 feet (61 meters) from their respective vehicles as indicated. For the roads of radius 250 meters, those dashed blocks are approximately 240 feet (73 meters) from their respective vehicles as indicated.

The vehicles 26-34 also project a high beam. FIG. 4 is similar to FIG. 2, but shows the high beam patterns on the same roadways for the same vehicles 26-34. A desired reach of the each high beam HB is also shown by the hatched blocks labeled DHB which stands for "DESIRED EXTENT OF HIGH BEAM."

Therefore, FIGS. 2 and 4 illustrate generalized headlamp beam patterns. The generalized beam pattern will not extend as far into the distance on roadways which curve leftward, such as roadways 16 and 18, compared with the extent of beam patterns on roadways which curve rightward, such as roadways 22 and 24.

One form of the invention seeks to extend the reach of the headlamp beams through usage of at least one or more auxiliary lamps. Another form of the invention seeks to produce beams which extend approximately the same distances on leftward curving roadways, such as roadways 16 and 18, compared with rightward curving roadways, such as 22 and 24.

To increase the reach of the beams, it may be thought that the simple expedient of increasing power to the headlamps would suffice. However, this is not desirable. One reason is that there is a requirement that light intensity within a certain section of the beam may not exceed a specified level. One such section is defined by the coordinates (0.86D, 3.5L), which refer to a line extending from the headlamp, at an angle of 0.86 degrees below horizontal (D means Down), and 3.5 degrees left of center (L means Left). It is pointed out that this line extends to the left for a left-side steering wheel vehicle and into the lane of oncoming traffic. Because of that, intensity along this line is restricted because the line leads to the driver of an oncoming vehicle.

Therefore, to extend the reach of the beams subject to this limitation on intensity, an apparatus explained in simplified form in FIG. 5 has been developed. The left column of FIG. 5 shows three simplified headlamp patterns 48, which are simplified renditions of the low beam pattern 50 in FIG. 6, which was discussed previously. The central column shows four auxiliary patterns 52, 54, 56 and 58, which are generated by lamps of design described later. The right column shows three composite beams, 60, 62 and 64, which contain the combined beams of the left and central columns.

It is pointed out that a blank region 66 in FIG. 5 is maintained, which corresponds to the blank regions 66 in the left column of FIG. 5 and the blank region 66 in FIG. 6. This blank region 66 can represent the location (0.86D, 3.5L) discussed above.

It is also pointed out that the types of beam pattern shown in FIG. 5 are simplifications for ease of understanding. They do not represent actual bird's eye views of headlamp beams. Rather, they indicate how a beam illuminates a roadway. They do not indicate how a beam illuminates the sides of a roadway for instance.

Moreover, the beam pattern of 54 in FIG. 5 can be derived from a lamp which produces the pattern 48 shown in the left column. That is, as shown in FIG. 7, if the pattern 48 is shrunk vertically to pattern 68 and a width W of the tail 70 is shrunk horizontally to produce pattern 72, then a pattern approximating pattern 56 may be obtained. Patterns 50, 74 and 76 are representations of the light distribution from the beam patterns 48, 68 and 72, respectively.

In one form of the invention, a composite beam of the type shown in FIG. 5, right-hand column contains two individual beams. One of them is a scaled replica of the regular low beam. Beam 48 in FIG. 5 is one such low beam. The scaling can occur in one, two, or all of the XY, YZ, and XZ planes. The orientations can be similar between the two beams, as in beams 48 and 56. In one form of the invention, one beam, such as beam 48, of the composite beam is a low beam. The overlapping or composite beam combined with the beam pattern 48 is generally a narrow bend auxiliary beam pattern (labeled 52, 54, 56 and 58 in FIG. 5). It should be understood that overlapping areas have an increased light intensity adapted to illuminate areas on the roadways that were not previously illuminated.

FIG. 8 is a cross-sectional intensity plot of a right-hand low beam. The units of the horizontal and vertical axes are in degrees. The five circles correspond to the five hatched boxes DLB in FIG. 2. FIG. 9 is a cross-sectional intensity plot of a left hand low beam. The five circles labeled correspond to the hatched boxes DHB in FIG. 4. The approximate positions, in terms of coordinates stated in degrees, of the circles are given in FIGS. 8 and 9.

FIG. 10 shows a headlamp assembly 78 according to one form of the invention that is adapted to create the auxiliary beam pattern. At least one or a plurality of light emitting diodes or LEDs 81 produces light. It can take the form of two-element LED sold under the name Osram Black Flat, which produce 500 lumens each. A lens 80, constructed of Poly Methyl Methacrylate, PMMA, focuses the light produced. A pair of optical stops or shields 82 mask or block the light.

A paraboloid reflector 84 reflects light produced by the LEDs toward the lens 80. FIGS. 10A, 10B and 10C illustrate operative principles of a paraboloid reflector. In FIG. 10, labels 45 provide dimensions of the components indicated. Light produced at a focus 90 is reflected as parallel rays R, which are parallel to the axis 92 of the parabolic reflector 88. If the reflector 88 is truncated at point 94, the remaining reflector 96 in FIG. 10B still reflects rays 98 in parallel if they originate at the focus 90. FIG. 10C is a perspective view of the truncated reflector 100, which is a paraboloid. FIGS. 27 and 28 provide alternate views of the apparatus 78 of FIG. 10, wherein FIG. 28 shows a step 106 of the shield 82 and FIG. 27 does not. Common components in FIGS. 27 and 28 are underlined.

FIG. 11 is a cross-sectional intensity plot of the light beam produced by the apparatus of the type shown in FIG. 10, and FIG. 12 is a greyscale plot indicating how the apparatus will illuminate a vertical wall.

FIG. 13 illustrates one form of the invention in the form of light beams produced. FIG. 13, top, is another rendition of the intensity plot of the type shown in FIG. 11. FIG. 13, bottom, is a cross-sectional plot of an ordinary low beam as used on the right-hand side of a vehicle.

FIG. 14 is a plot of the two beams of FIG. 13 combined. Notice, as schematically shown in FIG. 16, two lamps 102 and 104, at least one of which comprises the assembly 78 produce the two beams of FIG. 13, and the lamps 102 and 104 are displaced from each other. FIG. 16 shows them displaced vertically, but displacement in other directions is contemplated. The following features of the composite beam of FIG. 14, compared with the ordinary low beam of FIG. 13, bottom, are to be noted. The locations stated, such as 2 degrees are necessarily approximate because they are taken from the graphs of the Figures, and the edges of the intensity plots do not always land precisely on an integral coordinate number, such as 2, 3, or 4.

In FIG. 13, bottom, the span of the spot of intensity 26,232 lm is roughly 2 degrees in length, spanning from zero to 2 degrees, that is, from zero to line A. In FIG. 14, top, the corresponding spot, of intensity 28,850 lm, has increased to roughly 5 degrees in width, spanning from just to the left of zero to positive 4.5 degrees (line H).

In FIG. 13, bottom, the spot of intensity 10,000 spans roughly 11.5 degrees in width, spanning from negative 2.5 (line B) to positive 9 degrees (line C). The corresponding spot in FIG. 14, bottom, runs from roughly negative 2.5 degrees (line J) to positive 11 degrees (line K). Notice also that the spot of intensity 5,000 lm is roughly 20.5 degrees in width, running from negative 6 degrees (line D) to positive 14.5 degrees (line E). The corresponding plot in FIG. 14, bottom, is about the same, running between lines L and M. Also, the spot of intensity 1,000 is roughly 23.5 degrees in width, running from negative 7 degrees (line F) to 16.5 degrees (line G). The corresponding spot in FIG. 14 is about the same, running between lines N and P.

The plot of FIG. 14, bottom, shows cross-sectional intensity of FIG. 14, top, but in greyscale.

FIG. 15 is a tabular presentation of the composite beam of FIG. 14, top, using standard nomenclature. In the tables of FIGS. 15 and 19, "RegMIN" is minimum required intensity. "ValueMIN" is measured intensity value. "RegMAX" is maximum allowable intensity. "ValueMAX" is measured value. The positions indicated in the left column are stated in terms of deviation from horizontal and centerline in terms of degrees. For example, "10U" means 10 degrees up (or above horizontal), while "0.6D" means six degrees down (or below horizontal). The "8L" means 8 degrees to left of centerline and "8R" means 8 degrees right of centerline.

FIG. 17 is similar to FIG. 13, but illustrates light beams projected on the left side of a vehicle. FIG. 17, top, is a cross-sectional view of light produced by an apparatus of the type shown in FIG. 10. FIG. 17, bottom, is a cross-sectional view of light produced by an ordinary low beam. The two beams of FIG. 17 are combined, in the manner of FIG. 16, to produce the composite beam of FIG. 18. Noteworthy differences between FIG. 17, bottom, and FIG. 18, top, include the following.

In FIG. 17, bottom, the spot of intensity 23,902 lm spot spans from negative 1.2 (line AA) to positive 1.6 (line BB), for a total span of 2.8 degrees. In FIG. 18, the corresponding spot is roughly the same, running from line Q to line R.

In FIG. 17, the spot of intensity 10,000 lm spans from negative 4.5 (line CC) to positive 4 degrees (line DD), for a total span of 8.5 degrees. In FIG. 18, the corresponding spot runs from minus 14.5 degrees (line S) to positive 4 degrees (line T), for a total span of 18.5 degrees.

In FIG. 17, the spot of intensity 5,000 lm spans from negative 14 degrees (line EE) to positive 6 degrees (line FF), for a total span of 20 degrees. In FIG. 18, the corresponding spot runs from negative 16 (line U) to positive 6 (line V), for a total span of 22 degrees.

FIG. 17, the spot of intensity 1,000 lm spans from negative 17 degrees (line GG) to positive 7 degrees (line HH), for a total span of 24 degrees. In FIG. 18, the corresponding spot is about the same, running from line W to line X.

The plot of FIG. 18, bottom, shows cross-sectional intensity of FIG. 18, top, but in greyscale.

FIG. 19 is a tabular presentation of the composite beam of FIG. 18, top, using standard nomenclature.

FIG. 20, top, is a greyscale presentation of the intensity pattern of FIG. 13, bottom. It is noted that the intensity of 25,232 lm is the same in both. FIG. 20, top, represents a regular low beam used on the right side of a vehicle.

FIG. 20, bottom, is a greyscale presentation of the intensity pattern of FIG. 14, top. It is noted that the intensity of 28,850 lm is the same in both.

FIG. 20, bottom, represents the intensity pattern of the combination of (1) an ordinary headlamp (bottom of FIG. 13) with (2) the auxiliary beam of the invention (top of FIG. 13).

FIG. 21, top, is a greyscale presentation of the intensity pattern of FIG. 17, bottom. It is noted that the intensity of 23,903 lm is the same in both. FIG. 21 represents a beam used on the driver's side of a vehicle.

In both FIGS. 20 and 21, an added distribution of light is found in the dashed boxes. There is a sharp cut-off at the tops of the boxes, and a soft gradient at the bottoms of the beams.

FIG. 22, top, depicts both left and right headlamp beams, without the invention. That is, the Figure is a bird's eye view of the beams of (1) FIG. 13, bottom, (which provides the right-hand beam of the vehicle, not separately shown in FIG. 22, top) plus (2) FIG. 17, bottom (which provides the left-hand beam of the vehicle, not separately shown). FIG. 22, and similar Figures, illustrate how the ground is illuminated. They show a footprint of the light beam.

FIG. 22, bottom, depicts both left and right headlamp beams, but with the invention implemented. That is, the Figure is a bird's eye view of the beams of FIG. 14, top, (which provides the right-hand beam of the vehicle in FIG. 22, not separately shown) plus FIG. 18, top (which provides the left-hand beam of the vehicle in FIG. 22).

FIG. 22A shows the beam of FIG. 22, top, which is shown in FIG. 22A, top, superimposed over the beam of FIG. 22, bottom, and that superposition is shown in FIG. 22A, bottom.

Several points A through F are identified in FIG. 22A, bottom. The coordinates read from the Figure are taken as follows:

A—(27, 14)
B—(32, 10)
C—(42, 20)
D—(45, 15)
E—(50, −15)
F—(37, −10)

By the Theorem of Pythagorus, the distance, or length, of each point from the origin is approximately the following:

Length A—30
Length B—34
Length C—47
Length D—47
Length E—52
Length F—38

The relative increases of the following beams are approximately as follows:

Increase of C over A 156 percent
Increase of D over B 138 percent
Increase of E over F 136 percent The angles of the beams are as follows:

Angle of A (and C) ARCTAN (14/27)=27 deg.
Angle of B (and D) ARCTAN (10/32)=17 deg.
Angle of F (and E) ARCTAN (15/50)=17 deg Therefore, one form of the invention provides the following desirable performance parameters.

At 27 degrees left, an increase in beam projection of 156 percent is attained (that is, C is 156 percent of A and both lie along 27 degrees left). In effect, point A is moved over 150 percent farther from the vehicle.

At 17 degrees left, an increase in beam projection of 138 percent is attained (that is, D is 138 percent of B, and both lie along 17 degrees left). In effect, point B is moved over 130 percent farther from the vehicle.

At 17 degrees right, an increase in beam projection of 136 percent is attained (that is, E is 136 percent of F, and both lie along 17 degrees right). In effect, point F is moved over 130 percent farther from the vehicle.

And this effective movement of points A, B, and F is accomplished without exceeding the brightness limit at (0.86D, 3.5L) in FIG. 8.

FIG. 23 shows a beam produced by the apparatus 78 of FIG. 10. FIG. 23, top, shows a right-hand beam, with the center located roughly 10 degrees to the right of center. FIG. 23, bottom, shows a left-hand beam, with the center located roughly 10 degrees to the left of center.

Both top and bottom views show cut lines CL, above which light is to be blocked. This cut can be achieved by a step 106 formed into the stop, as shown in FIG. 25. Section 108 is shown in enlarged form at the bottom of the Figure and shows the step 106, which narrows the beam in the vertical direction on the left side of the Figure.

The step 106 alters the height of an exit aperture 110 in FIG. 25. At one location, the exit aperture 110 has a first aperture height 112. At another location, the exit aperture 100 has a second aperture height 114. The change in height alters the height of the projected beam, causing the cuts in FIG. 23.

This change in height also causes the exit aperture 110, with the cutoff or step 106, to be non-symmetrical. That is, an arched exit aperture (not shown) would have different heights, but would be symmetrical, left-to-right. Note, however, that there is only a single step 106 in FIG. 25, and thus the aperture 110 with step is non-symmetrical because the cutoff or step 106 is non-symmetrical.

FIG. 24 shows a generic beam of the type shown in FIG. 26, top. This is shown for comparison.

FIG. 26, top, shows a beam produced by the apparatus 78 of the type in FIG. 10, and FIG. 26, bottom, shows a beam produced by the apparatus of the type in FIG. 25, where the step or cutoff 106 is present.

FIGS. 30-33 illustrate headlamps of an automobile, together with projection patterns of the type discussed earlier herein.

The lamp 205 in FIG. 30 utilizes components represented in FIG. 34.

Reflector 84 is a partial ellipse in shape and has two foci F1 and F2. The light source, such as an LED, is located at focus F1. It is a geometric fact that light passing through F1 will be reflected by the elliptical reflector 84 to the other focus F2, which is shown as indicated. A shield 82 eclipses or shields some of the light, as indicated by the blocked ray R. Shield 82 may contain the STEP indicated in FIG. 25, wherein shield is labeled 48.

As indicated in the left side of FIG. 34, the rays transmitted are divergent. This divergence can be explained as follows.

Reflector 84 is elliptical in vertical cross section, such as section S2 in FIG. 38. FIG. 37 shows six ellipses. In FIG. 37A, point C is located at negative 2 units on the y-axis. In FIG. 37B, point C is located at negative 3 units, and in FIG. 37C point C is located at negative 4 units. The movement of point C represents a change in ellipse dimension b in FIG. 37G. It is noted that the foci f1 and f2 remain unchanged in FIGS. 37 A-C. However, in FIGS. 37D-37F, not only does dimension b of FIG. 37G change, but dimension a changes also. It is noted that the foci f1 and f2 become farther apart as one moves from FIG. 37D to FIG. 37F.

This background on the properties of ellipses can now be used to explain the generation of focal line L in FIGS. 35 and 38. FIG. 38 shows a highly simplified rendition of reflector 84. Cross sections S1-S5 are shown, all of which are elliptical. The foci for these sections are given as follows:

| CROSS SECTION | FOCI |
|---|---|
| S1(FIG. 38) | F1A, F1B |
| S2 | F2A, F2B |
| S3 | F3A, F3B |
| S4 | F4A, F4B |
| S5 | F5A, F5B |

Section S1 is analogous to the small ellipse of FIG. 37D, wherein the foci f1 and f2 are relatively close together, as are foci F1A and F1B in FIG. 38. In FIG. 37D, dimensions a and b of FIG. 37G are relatively small. Section S2 is analogous to the medium ellipse of FIG. 37E, wherein the foci f1 and f2 are a middling distance apart, as are foci F2A and F2B in FIG. 38. In FIG. 37E, dimensions a and b of FIG. 37G are of medium size. Section S3 is analogous to the large ellipse of FIG. 37F, wherein the foci f1 and f2 are relatively far apart, as are foci F3A and F3B in FIG. 38. In FIG. 37F, dimensions a and b of FIG. 37G are relatively large.

Therefore, it can be seen that proper selection of the shapes of elliptical sections S1-S5 in FIG. 38, and all the intermediate sections (not shown), will produce a line L, along which the foci lie, which has the desired curvature, to produce the desired divergence indicated in FIGS. 34 and 35.

Additional Considerations

1. It is common that government regulations limit the brightness of headlamps at certain locations. For example, the location (0.86D, 3.5L), meaning 0.86 degrees down from horizontal and 3.5 degrees left of center, can have a limit in most countries, including the United States. This location is roughly indicated in FIG. 8. The ordinary headlamp, does not exceed this limit. In one form of the invention, the augmentation and generation of the composite beam (shown at the bottom in FIG. 22) provided by lamp 102 in FIG. 16 also does not exceed this limit. Therefore, in one form of the invention, in FIG. 9, brightness is increased at predetermined areas, such as at the location of the circle at (13.5L, 0.6D), but without exceeding the legal intensity limit imposed at (0.86D, 3.5L).

Brightness can also be increased in FIG. 9 at any or all of (9.5L, 0.3D), (9R, 0.3D), and (12.4R, 0.6D) without exceeding this limit. These three locations in FIG. 9 refer to the second, fourth, and fifth circles, starting at the left side.

2. In one form of the invention, the circles in FIGS. 8 and 9 receive increased illumination, while no significant illumination is projected above the horizontal, which is zero degrees up or down, and there is no significant addition to the blank region 66 in FIG. 5.

3. Vehicles in general have a "driver's side," which is the side occupied by the driver of the vehicle. In countries where vehicles use the right-hand side of a roadway, the driver's side is the left side of the vehicle. In countries where vehicles use the left-hand side of a roadway, the driver's side is the right side of the vehicle. The passenger side is opposite to the driver's side.

In one form of the invention, the primary headlights do not extend as far forward on the driver's side of the vehicle as they do on the passenger side. FIG. 2 provides an example. On the upper curved roads at 150 and 250 radii, the beams do not reach as far as on the lower curved roads at the same radii.

4. In FIG. 3, points P1, P2, and P3 are located at the DESIRED EXTENTS OF LOW BEAMS indicated in FIG. 2. Point P1 is located 75 feet (23 meters) outboard of the driver's side and 225 feet (69 meters) forward of the vehicle. The corresponding dimensions for point P2 are indicated. Point P3 has the same dimensions as P2, except that P3 is outboard on the passenger side, not the driver's side.

In one form of the invention, intensity at these points is relatively low. The invention uses an auxiliary headlamp to increase the intensity at these points, but without increasing intensity at certain other points, where intensity is restricted, such as at (0.86D, 3.5L).

This invention, including all embodiments shown and described herein, could be used alone or together and/or in combination with one or more of the features covered by one or more of the claims set forth herein, including but not limited to one or more of the features or steps mentioned in the bullet list in the Summary of the Invention and the Claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A headlamp system of a vehicle, comprising:

a primary lamp unit having a first light source configured to form a light distribution pattern forward of said vehicle and having a distance boundary in front of the vehicle beyond which light of the first light source is less than a predetermined minimum luminance value, wherein said light distribution pattern defines a blank region outside of said boundary and having a luminance value less than said minimum luminance value, said blank region being located at a predetermined coordinate which is a predetermined distance forward of said vehicle and a predetermined distance outboard of a driver's side of said vehicle; and an auxiliary light source configured to provide illumination which supplements the first light source thereby providing a composite beam having a desired pattern which extends a distance of said boundary forward of the light distribution pattern while maintaining said blank region at the predetermined coordinate by increasing illumination in predetermined areas of the light distribution pattern, wherein an auxiliary light beam from the auxiliary light source and the blank region are on the same side of the vehicle, wherein said auxiliary light source includes a light source;

a reflector having different elliptical cross sections along its length;

an optical stop that forms part of a non-symmetrical exit aperture of said auxiliary light source, and causes said exit aperture to assume a first height at a first location and a second height at a second location; and a lens that receives light exiting said exit aperture and projects said light forward of said vehicle.

2. The headlamp system according to claim 1, wherein the predetermined areas of the light distribution areas includes a location having an angle of 0.6 degrees below horizontal and 13.5 degrees left of center.

3. The headlamp system according to claim 1, wherein one of said desired pattern extends said boundary to a distance located at least 225 feet (69 meters) forward of said vehicle and at least 75 feet (23 meters) outboard of said vehicle on a driver's side.

4. The headlamp system according to claim 1, wherein one of said desired pattern extends said boundary to a distance located at least 225 feet (69 meters) forward of said vehicle and at least 75 feet (23 meters) outboard of said vehicle on a passenger's side.

5. The headlamp system according to claim 1, wherein a limit is placed on illumination intensity at a line at an angle of 0.86 degrees below horizontal and 3.5 degrees left of center, said composite beam not exceeding said limit to maintain said blank region.

6. The headlamp system according to claim 1, wherein said auxiliary light source is situated in a separate housing compared to said primary lamp unit.

7. The headlamp system according to claim 1, wherein the illumination from the auxiliary light beam has a pattern which is a scaled replica of the light distribution pattern.

8. An auxiliary headlamp for a vehicle, comprising:
at least one light source;
a reflector that receives light rays from said light source and reflects said light rays forward of said vehicle;
an optical shield or mask between said reflector and said lens which forms part of a non-symmetrical exit aperture of said auxiliary headlamp; and
a lens which receives light exiting said exit aperture and projects light forward of said vehicle;
said auxiliary headlamp providing an auxiliary light beam for supplementing an intensity of a primary beam having a light distribution pattern which defines a partial perimeter of a predetermined blank region for preventing a dazzle effect to drivers of oncoming traffic, wherein the auxiliary light beam extends a distance of said light distribution pattern forward of the vehicle while maintaining said blank region by increasing illumination in predetermined areas of the light distribution pattern, the auxiliary light beam and the blank region being on the same side of the vehicle.

9. The auxiliary headlamp according to claim 8, wherein said primary beam comprises a maximum luminous intensity at an area of said predetermined blank region primary beam;
wherein a luminous intensity of said primary beam and said auxiliary beam combined at said predetermined area do not exceed a predetermined limit.

10. The auxiliary headlamp according to claim 9, wherein said predetermined blank region is approximately located at an angle of 0.86 degrees below horizontal and 3.5 degrees left of center of said primary beam.

11. The auxiliary headlamp according to claim 9, wherein said auxiliary beam increases illumination of the light distribution pattern at a location of at a line at an angle of 0.86 degrees below horizontal and 3.5 degrees left of center.

12. The auxiliary headlamp according to claim 8, wherein said exit aperture has a first height on one side of a step and a different height on the other side of said step.

13. The auxiliary headlamp according to claim 8, wherein said auxiliary light beam is generally rectangular.

14. An auxiliary headlamp of a vehicle in which government regulations place maximum intensity limits which a headlamp beam projects in a first area of the headlamp beam in front of the vehicle comprising:
at least one light source;
a reflector which reflects light emitted from said at least one light source forward of said vehicle;
an optical shield or mask which cooperates with said reflector to form an exit aperture and which has a step which reduces a height of said exit aperture on at least one side; and
a lens which focuses light received from said at least one light source and said exit aperture, wherein:
said auxiliary headlamp does not increase intensity in said first area of said headlamp beam, while also increasing an intensity of at least one other area in front of the vehicle of said headlamp beam above said maximum intensity limits, an auxiliary light beam from the auxiliary headlamp and the first area are on a same side of the vehicle.

15. The auxiliary headlamp according to claim 14, wherein said step causes a region of reduced intensity in said beam of said auxiliary headlamp, thereby preventing intensity in a first direction from exceeding said limit.

16. The auxiliary headlamp according to claim 14, wherein said predetermined area comprises a direction of about an angle of 0.86 degrees below horizontal and 3.5 degrees left of center.

17. The auxiliary headlamp according to claim 14, wherein said at least one other area passes through a point located at least 225 feet (69 meters) forward of said vehicle, and at least 75 feet (23 meters) outboard of said vehicle on a driver's side.

18. The auxiliary headlamp according to claim 14, wherein said at least one other area passes through a point located at least 225 feet (69 meters) forward of said vehicle, and at least 75 feet (23 meters) outboard of said vehicle on a passenger's side.

19. The auxiliary headlamp according to claim 14, wherein the optical shield comprises two shields that form an L-shape in cross-section.

* * * * *